(12) United States Patent
Choi et al.

(10) Patent No.: US 12,113,982 B2
(45) Date of Patent: *Oct. 8, 2024

(54) CCLM-BASED INTRA-PREDICTION METHOD AND DEVICE

(71) Applicant: TCL King Electrical Appliances (Huizhou) Co. Ltd., Huizhou (CN)

(72) Inventors: Jangwon Choi, Seoul (KR); Jin Heo, Seoul (KR); Sunmi Yoo, Seoul (KR); Ling Li, Seoul (KR)

(73) Assignee: TCL King Electrical Appliances (Huizhou) Co. Ltd., Huizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,473

(22) Filed: Oct. 12, 2023

(65) Prior Publication Data
US 2024/0048714 A1    Feb. 8, 2024

Related U.S. Application Data

(63) Continuation of application No. 17/739,468, filed on May 9, 2022, now Pat. No. 11,973,954, which is a (Continued)

(30) Foreign Application Priority Data

Jul. 2, 2018    (KR) .................. 10-2018-0076446

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/172* (2014.11); *H04N 19/196* (2014.11)

(58) Field of Classification Search
CPC .. H04N 19/132; H04N 19/105; H04N 19/159; H04N 19/172; H04N 19/196
See application file for complete search history.

(56) References Cited

U.S. PATENT DOCUMENTS 11,356,668 B2 *  6/2022  Choi .................... H04N 19/593
11,973,954 B2 *  4/2024  Choi .................... H04N 19/172

\* cited by examiner

*Primary Examiner* — Jeffery A Williams
(74) *Attorney, Agent, or Firm* — PV IP PC; Wei Te Chung; Zhigang Ma

(57) ABSTRACT

A method for decoding a picture based on a cross-component linear model (CCLM) mode includes deriving neighboring luma reference samples of a luma block, deriving down-sampled neighboring luma reference samples, deriving a linear model parameter based on the down-sampled neighboring luma reference samples and the neighboring chroma reference samples, where the neighboring luma reference samples includes top neighboring luma reference samples, and left neighboring luma reference samples, and where when the top boundary of the luma block overlaps with a boundary of a coding tree unit (CTU), the number of the top neighboring luma reference samples used for deriving the down-sampled neighboring luma reference samples among the neighboring luma reference samples is less than that of the left neighboring luma reference samples used for deriving the down-sampled neighboring luma reference samples.

3 Claims, 16 Drawing Sheets

Related U.S. Application Data continuation of application No. 17/104,082, filed on Nov. 25, 2020, now Pat. No. 11,356,668, which is a continuation of application No. 16/801,538, filed on Feb. 26, 2020, now Pat. No. 10,887,596, which is a continuation of application No. PCT/KR2019/007582, filed on Jun. 24, 2019.

(60) Provisional application No. 62/741,528, filed on Oct. 4, 2018, provisional application No. 62/700,181, filed on Jul. 18, 2018.

(51) Int. Cl.
*H04N 19/159* (2014.01)
*H04N 19/172* (2014.01)
*H04N 19/196* (2014.01)

FIG. 4
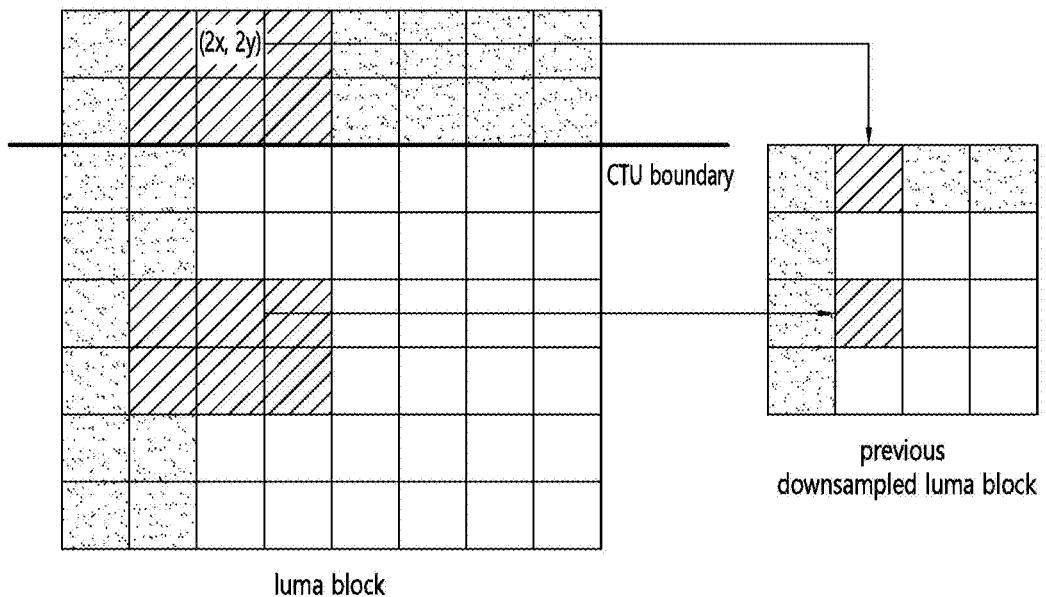
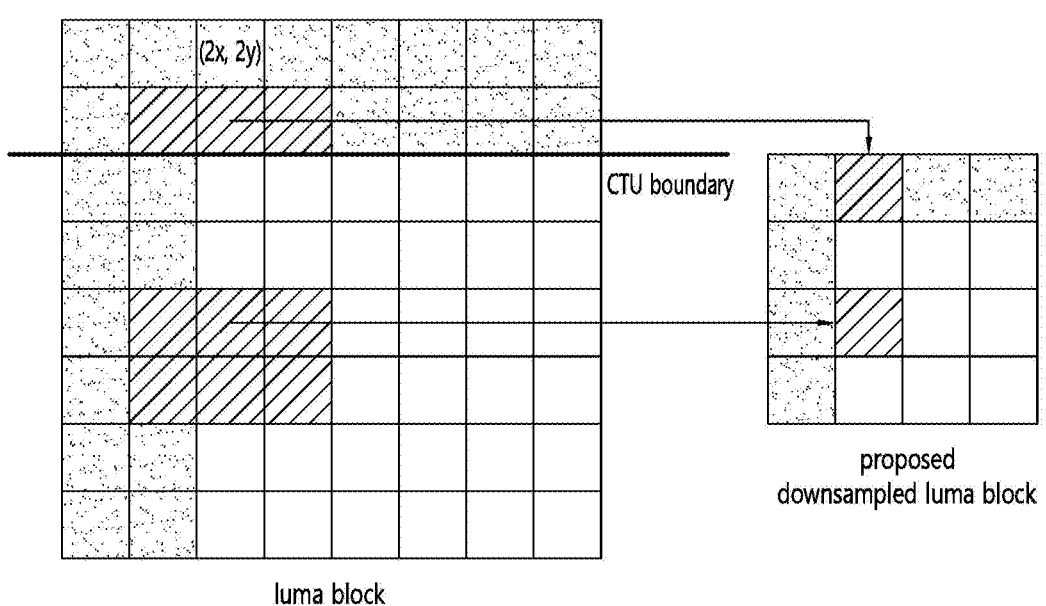

FIG. 11
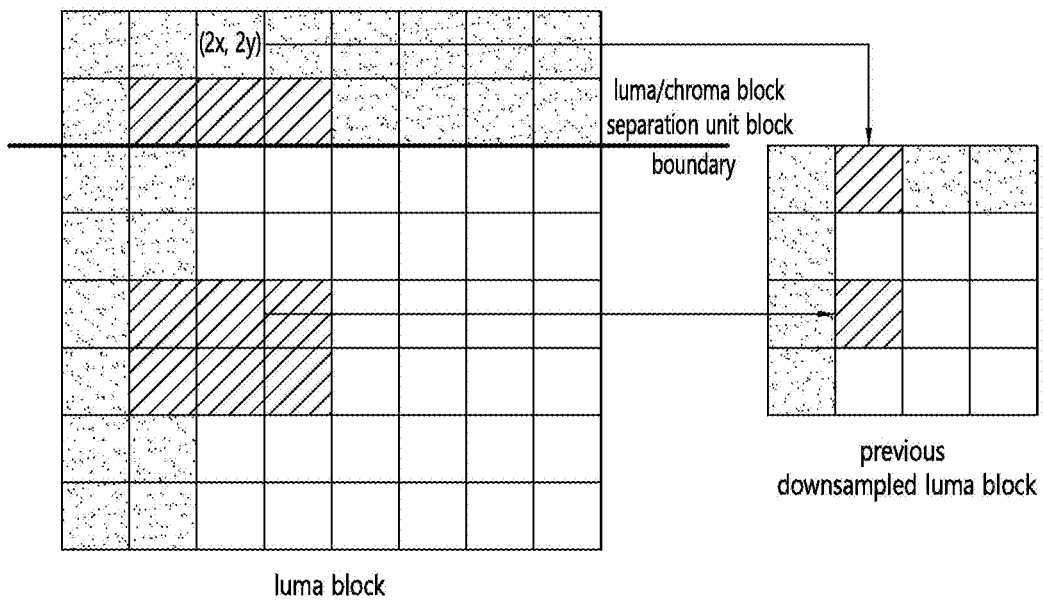
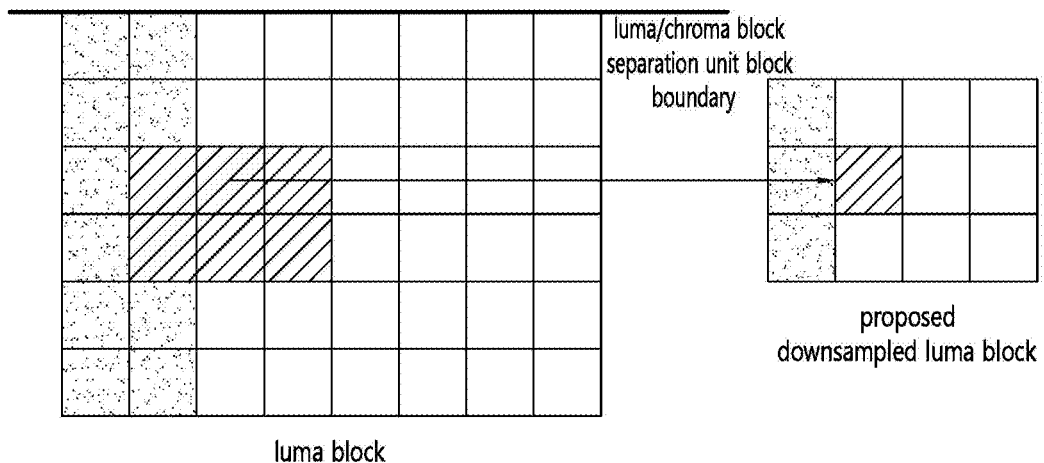

CCLM-BASED INTRA-PREDICTION METHOD AND DEVICE

CROSS-REFERENCE TO RELATED APPLICATIONS

Pursuant to 35 U.S.C. § 119(e), this application is a continuation of U.S. application Ser. No. 17/739,468 filed on May 9, 2022, which is a continuation of U.S. application Ser. No. 17/104,082 filed on Nov. 25, 2020 and issued on Jun. 7, 2022 as U.S. Pat. No. 11,356,668, which is a continuation of U.S. application Ser. No. 16/801,538 filed on Feb. 26, 2020 and issued on Jan. 5, 2021 as U.S. Pat. No. 10,887,596, which is continuation of International Application PCT/KR2019/007582, with an international filing date of Jun. 24, 2019, which claims the benefit of U.S. Provisional Application Nos. 62/700,181 filed on Jul. 18, 2018 and 62/741,528 filed on Oct. 4, 2018, and Korean Patent Application No. 10-2018-0076446 filed on Jul. 2, 2018, the contents of all of which are hereby incorporated by reference herein in their entirety.

RELATED ART

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high-quality images.

SUMMARY

This document provides a method and apparatus for enhancing image coding efficiency.

This document further provides a method and apparatus for enhancing image coding efficiency based on intra prediction.

This document further provides a method and apparatus for enhancing efficiency of CCLM-based intra prediction.

This document further provides a method and apparatus for enhancing a pipeline delay when implementing CCLM-based intra prediction in hardware.

This document further provides a method and apparatus for enhancing image coding efficiency by downsampling neighboring luma reference samples of a 1-sample line (hereinafter, '1-sample line' means samples of one line) when performing CCLM-based intra prediction.

In an aspect, a method for decoding a picture, performed by a decoding apparatus is provided. The method includes deriving neighboring chroma reference samples for a chroma block when an intra prediction mode of the chroma block is a cross-component linear model (CCLM) mode; deriving neighboring luma reference samples of a luma block corresponding to the chroma block and luma samples in the luma block; deriving down-sampled neighboring luma reference samples and down-sampled luma samples by down-sampling the neighboring luma reference samples and the luma samples; deriving a linear model parameter based on the down-sampled neighboring luma reference samples and the neighboring chroma reference samples; generating prediction samples for the chroma block based on the linear model parameter and the down-sampled luma samples of the luma block; and reconstructing the chroma block based on the prediction samples for the chroma block, wherein the neighboring luma reference samples include top neighboring luma reference samples located at the upper side of a top boundary of the luma block and left neighboring luma reference samples located at the left side of a left boundary of the luma block, and wherein when the top boundary of the luma block overlaps with a boundary of a coding tree unit (CTU), the number of the top neighboring luma reference samples used for deriving the down-sampled neighboring luma reference samples among the neighboring luma reference samples is less than that of the left neighboring luma reference samples used for deriving the down-sampled neighboring luma reference samples.

In another aspect, a decoding apparatus for performing picture decoding is provided. When an intra prediction mode of a chroma block is a CCLM mode, the decoding apparatus includes an adder for deriving neighboring chroma reference samples for the chroma block and neighboring luma reference samples of a luma block corresponding to the chroma block and luma samples in the luma block; and a prediction unit for deriving down-sampled neighboring luma reference samples and down-sampled luma samples by downsampling the neighboring luma reference samples and the luma samples, deriving a linear model parameter based on the down-sampled neighboring luma reference samples and the neighboring chroma reference samples, and generating prediction samples for the chroma block based on the linear model parameter and the down-sampled luma samples of the luma block, wherein the adder reconstructs the chroma block based on the prediction samples for the chroma block, and the neighboring luma reference samples include top neighboring luma reference samples located at the upper side of a top boundary of the luma block and left neighboring luma reference samples located at the left side of the left boundary of the luma block, and when the top boundary of the luma block overlaps with a boundary of a coding tree unit (CTU), the number of the top neighboring luma reference samples used for deriving the down-sampled neighboring luma reference samples among the neighboring luma reference samples is less than that of the left neighboring luma reference samples used for deriving the down-sampled neighboring luma reference samples.

In another aspect, a method for encoding a picture performed by an encoding apparatus is provided. The method includes deriving neighboring chroma reference samples for a chroma block when an intra prediction mode of the chroma block is a cross-component linear model (CCLM) mode; deriving neighboring luma reference samples of a luma block corresponding to the chroma block and luma samples in the luma block; deriving down-sampled neighboring luma reference samples and down-sampled luma samples by down-sampling the neighboring luma reference samples and the luma samples; deriving a linear model parameter based on the down-sampled neighboring luma reference samples and the neighboring chroma reference samples; generating prediction samples for the chroma block based on the linear model parameter and the down-sampled luma samples of the luma block; deriving residual samples for the chroma block based on the prediction samples for the chroma block; and encoding picture information including information about the residual samples, wherein the neighboring luma reference samples include top neighboring luma reference samples located at the upper side of a top boundary of the luma block, and left neighboring luma reference samples located at the left side of a left boundary of the luma block, and wherein when the top boundary of the luma block overlaps with a boundary of a coding tree unit (CTU), the number of the top neighboring luma reference samples used for deriving the down-sampled neighboring luma reference samples among the neighboring luma reference samples is less than that of the left neighboring luma reference samples used for deriving the down-sampled neighboring luma reference samples.

In another aspect, an encoding apparatus for performing picture encoding is provided. When an intra prediction mode of a chroma block is a CCLM mode, the encoding apparatus includes an adder for deriving neighboring chroma reference samples for the chroma block and neighboring luma reference samples of a luma block corresponding to the chroma block and luma samples in the luma block; a prediction unit for deriving down-sampled neighboring luma reference samples and down-sampled luma samples by downsampling the neighboring luma reference samples and the luma samples, deriving a linear model parameter based on the down-sampled neighboring luma reference samples and the neighboring chroma reference samples, and generating prediction samples for the chroma block based on the linear model parameter and down-sampled luma samples of the luma block; a residual processor for deriving residual samples for the chroma block based on the prediction samples for the chroma block; and an entropy encoding unit for encoding picture information including information about the residual samples, wherein the neighboring luma reference samples include top neighboring luma reference samples located at the upper side of a top boundary of the luma block and left neighboring luma reference samples located at the left side of the left boundary of the luma block, and when the top boundary of the luma block overlaps with a boundary of a coding tree unit (CTU), the number of the top neighboring luma reference samples used for deriving the down-sampled neighboring luma reference samples among the neighboring luma reference samples is less than that of the left neighboring luma reference samples used for deriving the down-sampled neighboring luma reference samples.

In another aspect, a storage medium readable by a decoder for storing picture information generated by a picture encoding method is provided, and the method of encoding the picture includes deriving neighboring chroma reference samples for a chroma block when an intra prediction mode of the chroma block is a cross-component linear model (CCLM) mode; deriving neighboring luma reference samples of a luma block corresponding to the chroma block and luma samples in the luma block; deriving down-sampled neighboring luma reference samples and down-sampled luma samples by down-sampling the neighboring luma reference samples and the luma samples; deriving a linear model parameter based on the down-sampled neighboring luma reference samples and the neighboring chroma reference samples; generating prediction samples for the chroma block based on the linear model parameter and the down-sampled luma samples of the luma block; deriving residual samples for the chroma block based on the prediction samples for the chroma block; and encoding picture information including information about the residual samples, wherein the neighboring luma reference samples include top neighboring luma reference samples located at the upper side of a top boundary of the luma block, and left neighboring luma reference samples located at the left side of a left boundary of the luma block, and wherein when the top boundary of the luma block overlaps with a boundary of a coding tree unit (CTU), the number of the top neighboring luma reference samples used for deriving the down-sampled neighboring luma reference samples among the neighboring luma reference samples is less than that of the left neighboring luma reference samples used for deriving the down-sampled neighboring luma reference samples.

According to this document, overall image/video compression efficiency can be improved.

According to this document, efficiency of image coding based on intra prediction can be improved.

According to this document, efficiency of CCLM-based intra prediction can be improved.

According to this document, pipeline delay can be improved when implementing CCLM-based intra prediction in hardware.

According to this document, when performing CCLM-based intra prediction, by down-sampling neighboring luma reference samples of a 1-sample line, image coding efficiency can be improved.

BRIEF DESCRIPTION OF THE DRAWINGS

FIG. 4 is a diagram illustrating CCLM-based intra prediction according to another embodiment.

FIG. 11 is a diagram illustrating an intra prediction process based on a CCLM according to another embodiment.

DESCRIPTION OF EXEMPLARY EMBODIMENTS

Figure 1:
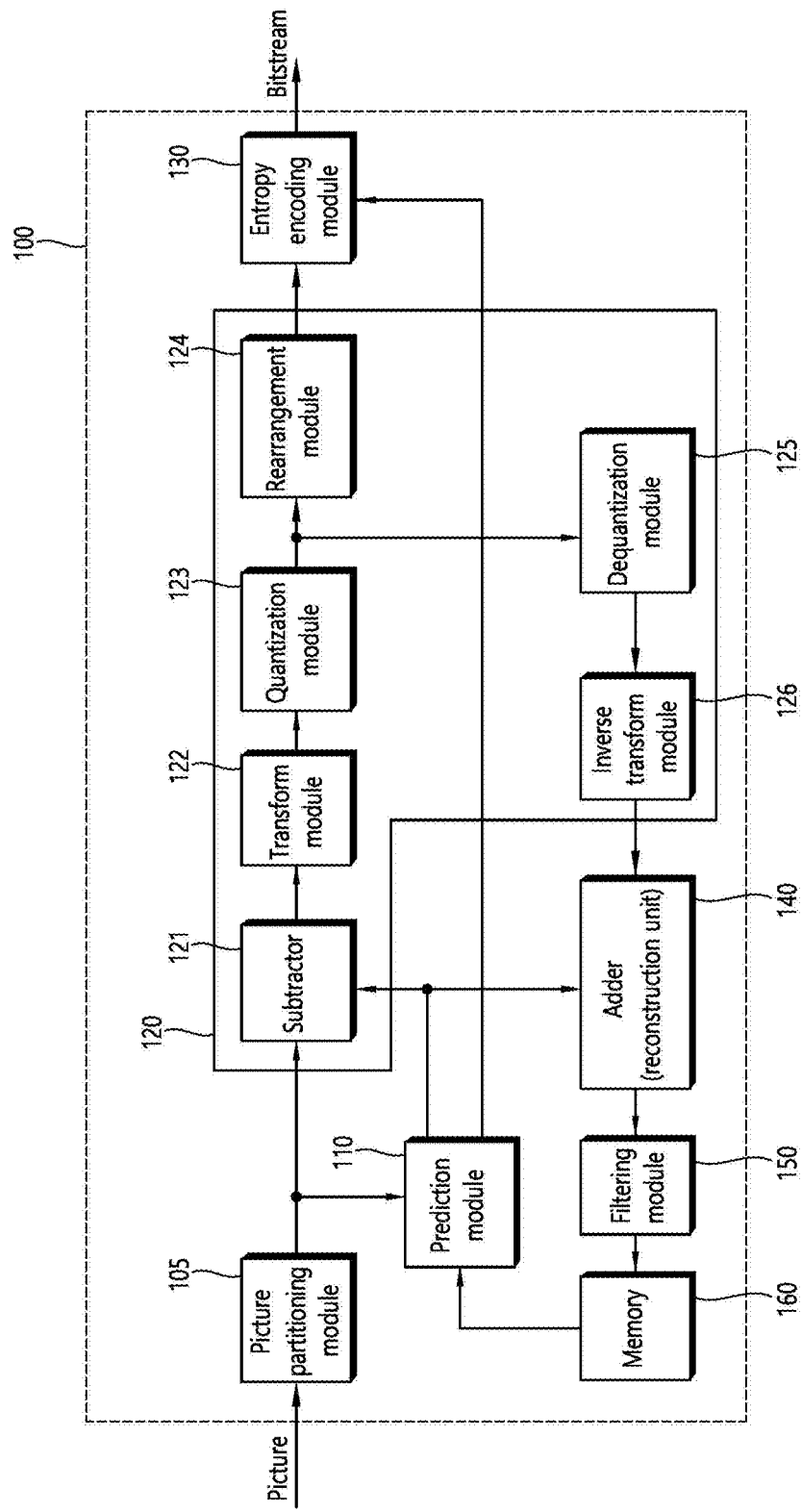
FIG. 1 is a diagram schematically illustrating a configuration of an encoding apparatus according to an embodiment.

According to an embodiment of this document, a method for decoding a picture, performed by a decoding apparatus is provided. The method includes deriving neighboring chroma reference samples for a chroma block when an intra prediction mode of the chroma block is a cross-component linear model (CCLM) mode; deriving neighboring luma reference samples of a luma block corresponding to the chroma block and luma samples in the luma block; deriving down-sampled neighboring luma reference samples and down-sampled luma samples by down-sampling the neighboring luma reference samples and the luma samples; deriving a linear model parameter based on the down-sampled neighboring luma reference samples and the neighboring chroma reference samples; generating prediction samples for the chroma block based on the linear model parameter and the down-sampled luma samples of the luma block; and reconstructing the chroma block based on the prediction samples for the chroma block, wherein the neighboring luma reference samples include top neighboring luma reference samples located at the upper side of a top boundary of the luma block and left neighboring luma reference samples located at the left side of a left boundary of the luma block, and wherein when the top boundary of the luma block overlaps with a boundary of a coding tree unit (CTU), the number of the top neighboring luma reference samples used for deriving the down-sampled neighboring luma reference samples among the neighboring luma reference samples is less than that of the left neighboring luma reference samples used for deriving the down-sampled neighboring luma reference samples.

This document can be modified in various forms, and specific embodiments thereof will be described and shown in the drawings. However, the embodiments are not intended for limiting this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

The following description relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Hereinafter, exemplary embodiments of this document will be described in detail with reference to the accompanying drawings. Hereinafter, the same reference numerals are used for the same components in the drawings, and redundant description of the same components is omitted.

In this document, video may refer to a series of images over time. Picture generally refers to a unit representing one image in a specific time zone, and a slice is a unit constituting part of a picture in coding. One picture may be configured with a plurality of slices, and if necessary, the picture and the slice may be mixed with each other.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma blocks. The unit may be used interchangeably with terms such as block or area in some cases. In a general case, an M×N block may include samples or a set of transform coefficients of M columns and N rows.

FIG. 1 is a diagram schematically illustrating a configuration of a video encoding apparatus to which this document may be applied. Hereinafter, an encoding/decoding apparatus may include a video encoding/decoding apparatus and/or an image encoding/decoding apparatus, and the video encoding/decoding apparatus may be used as a concept including an image encoding/decoding apparatus or the image encoding/decoding apparatus may be used as a concept including a video encoding/decoding apparatus.

Referring to FIG. 1, an (video) encoding apparatus 100 may include a picture partitioning module 105, a prediction module 110, a residual processing module 120, an entropy encoding module 130, an adder 140, a filtering module 150, and a memory 160. The residual processing module 120 may include a subtractor 121, a transform module 122, a quantization module 123, a rearrangement module 124, a dequantization module 125, and an inverse transform module 126.

The picture partitioning module 105 may divide an input picture into at least one processing unit.

As an example, the processing unit may be referred to as a coding unit (CU). In this case, the coding unit may be recursively divided according to a quad-tree binary-tree (QTBT) structure from a largest coding unit (LCU). For example, one coding unit may be divided into a plurality of coding units of a deeper depth based on a quad tree structure, a binary tree structure, and/or a ternary tree structure. In this case, for example, the quad tree structure may be first applied, and the binary tree structure and the ternary tree structure may be applied later. Alternatively, the binary tree structure/tunary tree structure may be first applied. A coding procedure according to this document may be performed based on a final coding unit that is no longer divided. In this case, a largest coding unit may be used immediately as a final coding unit based on coding efficiency according to an image characteristic or the coding unit may be recursively divided into coding units of deeper depths, as needed and thus a coding unit of an optimized size may be used as a final coding unit. Here, the coding procedure may include a procedure such as prediction, transform, and reconstruction to be described later.

As another example, the processing unit may include a coding unit (CU), a prediction unit (PU), or a transform unit (TU). The coding unit may be split from a largest coding unit (LCU) into coding units of deeper depths according to a quad tree structure. In this case, the largest coding unit may be immediately used as a final coding unit based on coding efficiency according to an image characteristic, or the coding unit may be recursively divided into coding units of lower depths, as needed and thus a coding unit of an optimized size may be used as a final coding unit. When a smallest coding unit (SCU) is set, the coding unit cannot be split into smaller coding units than the SCU. Here, the final coding unit means a coding unit to be the basis of being partitioned or split into a prediction unit or a transform unit. The prediction unit is a unit to be partitioned from the coding unit and may be a unit of sample prediction. In this case, the prediction unit may be divided into sub blocks. The transform unit may be divided according to a quad tree structure from the coding unit and may be a unit for deriving a transform coefficient and/or a unit for deriving a residual signal from the transform coefficient. Hereinafter, a coding unit may be referred to as a coding block (CB), a prediction unit may be referred to as a prediction block (PB), and a transform unit may be referred to as a transform block (TB). The prediction block or the prediction unit may mean a specific area of a block form within a picture and include an array of prediction samples. Further, the transform block or the transform unit may mean a specific area of a block form within a picture and include an array of transform coefficients or residual samples.

The prediction module 110 may perform prediction on a block to be processed (hereinafter, may mean a current block or a residual block) and generate a predicted block including prediction samples for the current block. A unit of prediction performed by the prediction module 110 may be a coding block, a transform block, or a prediction block.

The prediction module 110 may determine whether intra prediction or inter prediction is applied to the current block. As an example, the prediction module 110 may determine whether intra prediction or inter prediction is applied in a CU unit.

In the case of intra prediction, the prediction module 110 may derive a prediction sample for a current block based on a reference sample outside the current block in a picture (hereinafter, a current picture) to which the current block belongs. In this case, the prediction module 110 may (i) derive a prediction sample based on average or interpolation of neighboring reference samples of the current block and (ii) derive the prediction sample based on a reference sample present in a specific (prediction) direction for a prediction sample of neighboring reference samples of the current block. A case of (i) may be referred to as a non-directional mode or a non-angle mode, and a case of (ii) may be referred to as a directional mode or an angular mode. In intra prediction, the prediction mode may have, for example, 33 directional prediction modes and at least two non-directional modes. The non-directional mode may include a DC prediction mode and a planner mode. The prediction module 110 may determine a prediction mode applied to the current block using the prediction mode applied to the neighboring block.

In the case of inter prediction, the prediction module 110 may derive a prediction sample for a current block based on a sample specified by a motion vector on a reference picture. The prediction module 110 may apply any one of a skip mode, a merge mode, and a motion vector prediction (MVP) mode to derive a prediction sample for the current block. In the case of the skip mode and the merge mode, the prediction module 110 may use motion information of the neighboring block as motion information of the current block. In the case of the skip mode, unlike the merge mode, the difference (residual) between the prediction sample and the original sample is not transmitted. In the case of the MVP mode, by using a motion vector predictor of the current block using a motion vector of the neighboring block as a motion vector predictor, a motion vector of the current block may be derived.

In the case of inter prediction, the neighboring block may include a spatial neighboring block existing in the current picture and a temporal neighboring block present in the reference picture. A reference picture including the temporal neighboring block may be referred to as a collocated picture (colPic). The motion information may include a motion vector and a reference picture index. Information such as prediction mode information and motion information may be (entropy) encoded and output in the form of a bitstream.

When motion information of the temporal neighboring block is used in the skip mode and the merge mode, the highest picture on a reference picture list may be used as the reference picture. Reference pictures included in the reference picture list may be arranged based on a difference in a picture order count (POC) between a current picture and a corresponding reference picture. The POC corresponds to display order of pictures and may be distinguished from the coding order.

The subtractor 121 generates a residual sample, which is a difference between the original sample and the prediction sample. When the skip mode is applied, residual samples may not be generated, as described above.

The transform module 122 transforms the residual sample in transform block units to generate transform coefficients. The transform module 122 may perform transform according to a size of the transform block and a prediction mode applied to the coding block or the prediction block that spatially overlaps with the transform block. For example, when intra prediction is applied to the coding block or the prediction block that overlaps with the transform block, and the transform block is a 4×4 residual array, the residual sample is transformed using a discrete sine transform (DST) kernel, and in other cases, the residual sample may be transformed using a discrete cosine transform (DCT) kernel.

The quantization module 123 may quantize transform coefficients to generate quantized transform coefficients.

The rearrangement module 124 rearranges the quantized transform coefficients. The rearrangement module 124 may rearrange quantized transform coefficients of a block form into a one-dimensional vector form through a coefficient scanning method. Here, the rearrangement module 124 has been described in a separate configuration, but the rearrangement module 124 may be part of the quantization module 123.

The entropy encoding module 130 may perform entropy encoding for the quantized transform coefficients. Entropy encoding may include, for example, encoding methods such as exponential Golomb, context-adaptive variable length coding (CAVLC), context-adaptive binary arithmetic coding (CABAC), and the like. The entropy encoding module 130 may encode according to entropy encoding or a predetermined method together with or separately from information (e.g., a value of a syntax element) necessary for video reconstruction other than the quantized transform coefficients. The encoded information may be transmitted or stored in units of network abstraction layer (NAL) units in the form of a bitstream. The bitstream may be transmitted through a network or may be stored in a digital storage medium. Here, the network may include a broadcasting network and/or a communication network, and the digital storage medium may include various storage media such as a universal serial bus (USB), secure digital (SD), compact disc (CD), digital video disc (DVD), Blu-ray, hard disk drive (HDD), solid state drive (SSD) and the like.

The dequantization module 125 inverse quantizes quantized values (quantized transform coefficients) in the quantization module 123, and the inverse transform module 126 inverse transforms inverse quantized values in the dequantization module 125 to generate a residual sample.

The adder 140 reconstructs the picture by combining the residual sample and the predictive sample. The residual sample and the prediction sample may be added in units of blocks to generate a reconstructed block. Here, the adder 140 has been described in a separate configuration, but the adder 140 may be part of the prediction module 110. The adder 140 may also be referred to as a reconstruction module or a reconstruction block generator.

The filtering module 150 may apply a deblocking filter and/or a sample adaptive offset to the reconstructed picture. Through deblocking filtering and/or sample adaptive offset, artifacts at a block boundary within the reconstructed picture or distortion in a quantization process may be corrected. The sample adaptive offset may be applied in a sample unit and may be applied after a process of deblocking filtering is completed. The filtering module 150 may apply an adaptive loop filter (ALF) to the reconstructed picture. The ALF may be applied to the reconstructed picture after the deblocking filter and/or sample adaptive offset is applied.

The memory 160 may store reconstructed pictures (decoded pictures) or information necessary for encoding/decoding. Here, the reconstructed picture may be a reconstructed picture in which the filtering process is completed by the filtering module 150. The stored reconstructed picture may be used as a reference picture for (inter) prediction of another picture. For example, the memory 160 may store (reference) pictures used for inter prediction. In this case, pictures used for inter prediction may be designated by a reference picture set or a reference picture list.

Figure 2:
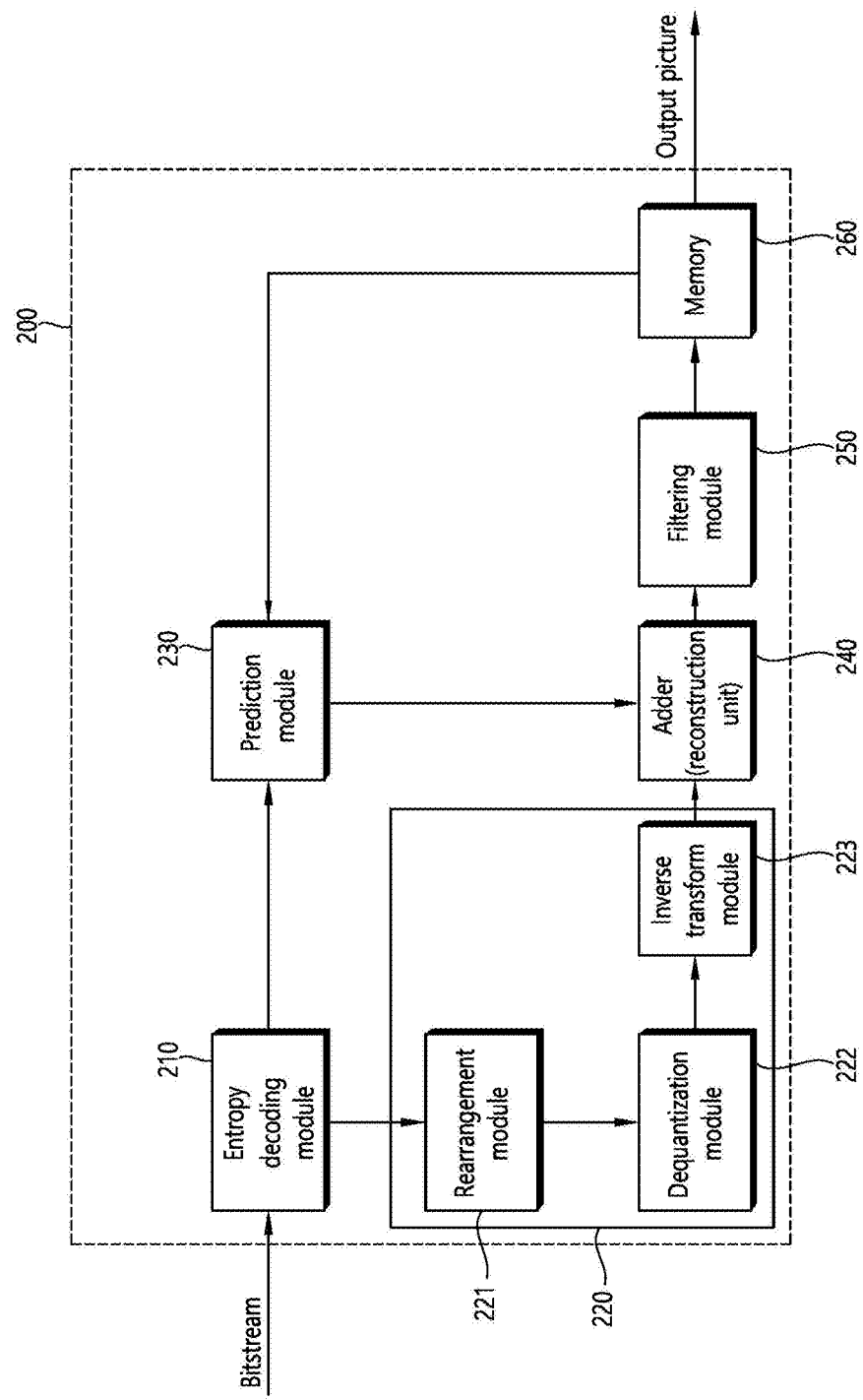
FIG. 2 is a diagram schematically illustrating a configuration of a decoding apparatus according to an embodiment.

FIG. 2 is a diagram schematically illustrating a configuration of a video/image decoding apparatus to which this document may be applied. Hereinafter, the video decoding apparatus may include an image decoding apparatus.

Referring to FIG. 2, the video decoding apparatus 200 may include an entropy decoding module 210, a residual processing module 220, a prediction module 230, an adder 240, a filtering module 250, and a memory 260. Here, the residual processing module 220 may include a rearrangement module 221, a dequantization module 222, and an inverse transform module 223. Further, although not shown, the video decoding apparatus 200 may include a receiver that receives bitstream including video information. The receiver may be configured as a separate module or may be included in the entropy decoding module 210.

When bitstream including video/image information is input, the video decoding apparatus 200 may reconstruct a video/image/picture to correspond to a process in which video/image information is processed in the video encoding apparatus.

For example, the video decoding apparatus 200 may perform video decoding using a processing unit applied in the video encoding apparatus. Thus, a processing unit block of video decoding may be, for example, a coding unit, and in another example, the processing unit block of video decoding may be a coding unit, a prediction unit, or a transform unit. The coding unit may be split according to a quad tree structure, a binary tree structure, and/or a ternary tree structure from the largest coding unit.

The prediction unit and the transform unit may be further used in some cases, and in this case, the prediction block is a block derived or partitioned from the coding unit and may be a unit of sample prediction. In this case, the prediction unit may be split into subblocks. The transform unit may be split according to the quad tree structure from the coding unit, and may be a unit for deriving a transform coefficient or a unit for deriving a residual signal from a transform coefficient.

The entropy decoding module 210 may parse bitstream and output information necessary for video reconstruction or picture reconstruction. For example, the entropy decoding module 210 may decode information in the bitstream based on a coding method such as exponential Golomb coding, CAVLC, or CABAC and output values of syntax elements required for video reconstruction and quantized values of transform coefficients for residuals.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information related to prediction among information decoded by the entropy decoding module 210 may be provided to the prediction module 230, and a residual value in which entropy decoding is performed by the entropy decoding module 210, i.e., the quantized transform coefficient may be input to the rearrangement module 221.

The rearrangement module 221 may rearrange the quantized transform coefficients in a two-dimensional block form. The rearrangement module 221 may perform rearrangement to correspond to coefficient scanning performed by the encoding apparatus. Here, the rearrangement module 221 has been described in a separate configuration, but the rearrangement module 221 may be part of the dequantization module 222.

The dequantization module 222 may dequantize the quantized transform coefficients based on the (inverse) quantization parameter to output the transform coefficients. In this case, information for deriving a quantization parameter may be signaled from the encoding apparatus.

The inverse transform unit 223 may inversely transform transform coefficients to derive residual samples.

The prediction module 230 may perform prediction of a current block and generate a predicted block including prediction samples for the current block. A unit of prediction performed by the prediction module 230 may be a coding block, a transform block, or a prediction block.

The prediction module 230 may determine whether to apply intra prediction or inter prediction based on information about the prediction. In this case, a unit for determining one of intra prediction and inter prediction to apply and a unit for generating a prediction sample may be different. Further, a unit for generating a prediction sample in inter prediction and intra prediction may also be different. For example, whether to apply inter prediction or intra prediction may be determined in units of a CU. Further, for example, in inter prediction, a prediction mode may be determined and a prediction sample may be generated in PU units, and in intra prediction, a prediction mode may be determined in PU units and a prediction sample may be generated in TU units.

In the case of intra prediction, the prediction module 230 may derive a prediction sample for a current block based on the neighbor reference samples in a current picture. By applying a directional mode or a non-directional mode based on the neighbor reference samples of the current block, the prediction module 230 may derive the prediction sample for the current block. In this case, the prediction mode to be applied to the current block may be determined using the intra prediction mode of the neighboring block.

In the case of inter prediction, the prediction module 230 may derive the prediction sample for the current block based on the sample specified on the reference picture by a motion vector on the reference picture. The prediction module 230 may apply one of a skip mode, a merge mode, and an MVP mode to derive a prediction sample for the current block. In this case, motion information required for inter prediction of the current block provided by the video encoding apparatus, for example, information about a motion vector, a reference picture index, and the like may be obtained or derived based on information about the prediction.

In case of the skip mode and the merge mode, motion information of the neighboring block may be used as motion information of the current block. In this case, the neighboring block may include a spatial neighboring block and a temporal neighboring block.

The prediction module 230 may construct a merge candidate list with motion information of available neighboring blocks and use information indicated by a merge index on the merge candidate list as a motion vector of the current block. The merge index may be signaled from the encoding apparatus. The motion information may include a motion vector and a reference picture. When motion information of the temporal neighboring block is used in the skip mode and the merge mode, a highest picture on the reference picture list may be used as a reference picture.

In case of the skip mode, unlike the merge mode, the difference (residual) between the prediction sample and the original sample is not transmitted.

In case of the MVP mode, the motion vector of the current block may be derived using the motion vector of the neighboring block as a motion vector predictor. In this case, the neighboring block may include a spatial neighboring block and a temporal neighboring block.

For example, when the merge mode is applied, a merge candidate list may be generated using a motion vector of a reconstructed spatial neighboring block and/or a motion vector corresponding to a Col block, which is a temporal neighboring block. In the merge mode, the motion vector of the candidate block selected from the merge candidate list is used as the motion vector of the current block. Information about the prediction may include a merge index indicating a candidate block having an optimal motion vector selected from candidate blocks included in the merge candidate list. In this case, the prediction module 230 may derive a motion vector of the current block using the merge index.

As another example, when the Motion Vector Prediction (MVP) mode is applied, a motion vector predictor candidate list may be generated using a motion vector corresponding to a motion vector of a reconstructed spatial neighboring block and/or a motion vector corresponding to a Col block, which is a temporal neighboring block. That is, a motion vector of the reconstructed spatial neighboring block and/or a motion vector corresponding to the Col vector, which is a temporal neighboring block, may be used as a motion vector candidate. The information about the prediction may include a prediction motion vector index indicating an optimal motion vector selected from the motion vector candidates included in the list. In this case, the prediction module 230 may select a predicted motion vector of the current block from the motion vector candidates included in the motion vector candidate list using the motion vector index. The prediction unit of the encoding apparatus may obtain a motion vector difference (MVD) between the motion vector of the current block and the motion vector predictor and encode the MVD to output the MVD in a bitstream form. That is, the MVD may be obtained by subtracting the motion vector predictor from the motion vector of the current block. In this case, the prediction module 230 may obtain a motion vector difference included in information about the prediction, and derive the motion vector of the current block by adding the motion vector difference and the motion vector predictor. The prediction unit may also obtain or derive a reference picture index or the like indicating a reference picture from the information about the prediction.

The adder 240 may add the residual sample and the predictive sample to reconstruct the current block or the current picture. The adder 240 may add the residual sample and the predictive sample in block units to reconstruct the current picture. When the skip mode is applied, the residual is not transmitted and thus the prediction sample may be a reconstruction sample. Here, the adder 240 has been described in a separate configuration, but the adder 240 may be part of the prediction module 230. The adder 240 may also be referred to as a reconstruction module or a reconstruction block generator.

The filtering module 250 may apply deblocking filtering sample adaptive offset and/or an ALF to the reconstructed picture. In this case, the sample adaptive offset may be applied in units of samples and be applied after deblocking filtering. The ALF may be applied after deblocking filtering and/or sample adaptive offset.

The memory 260 may store reconstructed pictures (decoded pictures) or information necessary for decoding. Here, the reconstructed picture may be a reconstructed picture in which a filtering procedure is completed by the filtering module 250. For example, the memory 260 may store pictures used for inter prediction. In this case, pictures used for inter prediction may be designated by a reference picture set or a reference picture list. The reconstructed picture may be used as a reference picture for another picture. Further, the memory 260 may output the reconstructed picture in output order.

As described above, in performing video coding, prediction is performed to increase compression efficiency. Thereby, a predicted block including prediction samples of the current block, which is a coding target block, may be generated. Here, the predicted block includes prediction samples in a spatial domain (or pixel domain). The predicted block is equally derived in the encoding apparatus and the decoding apparatus, and the encoding apparatus may signal information (residual information) about residual between the original block and the predicted block instead of an original sample value itself of the original block to the decoding apparatus to increase image coding efficiency. The decoding apparatus may derive a residual block including residual samples based on the residual information, generate a reconstructed block including reconstructed samples by adding the residual block and the predicted block, and generate a reconstructed picture including reconstructed blocks.

The residual information may be generated through transform and quantization procedures. For example, the encoding apparatus may derive a residual block between the original block and the predicted block, perform a transform procedure of residual samples (residual sample array) included in the residual block to derive transform coefficients, perform a quantization procedure of the transform coefficients to derive the quantized transform coefficients, and signal related residual information to the decoding apparatus (through bitstream). Here, the residual information may include information such as value information of the quantized transform coefficients, position information, a transform scheme, a transform kernel, and a quantization parameter. The decoding apparatus may perform an inverse quantization/inverse transformation procedure and derive residual samples (or residual blocks) based on the residual information. The decoding apparatus may generate a reconstructed picture based on the predicted block and the residual block. The encoding apparatus may inverse quantize/inverse transform quantized transform coefficients for reference for inter prediction of a subsequent picture to derive the residual block, and generate a reconstructed picture based on the residual block.

Figure 3:
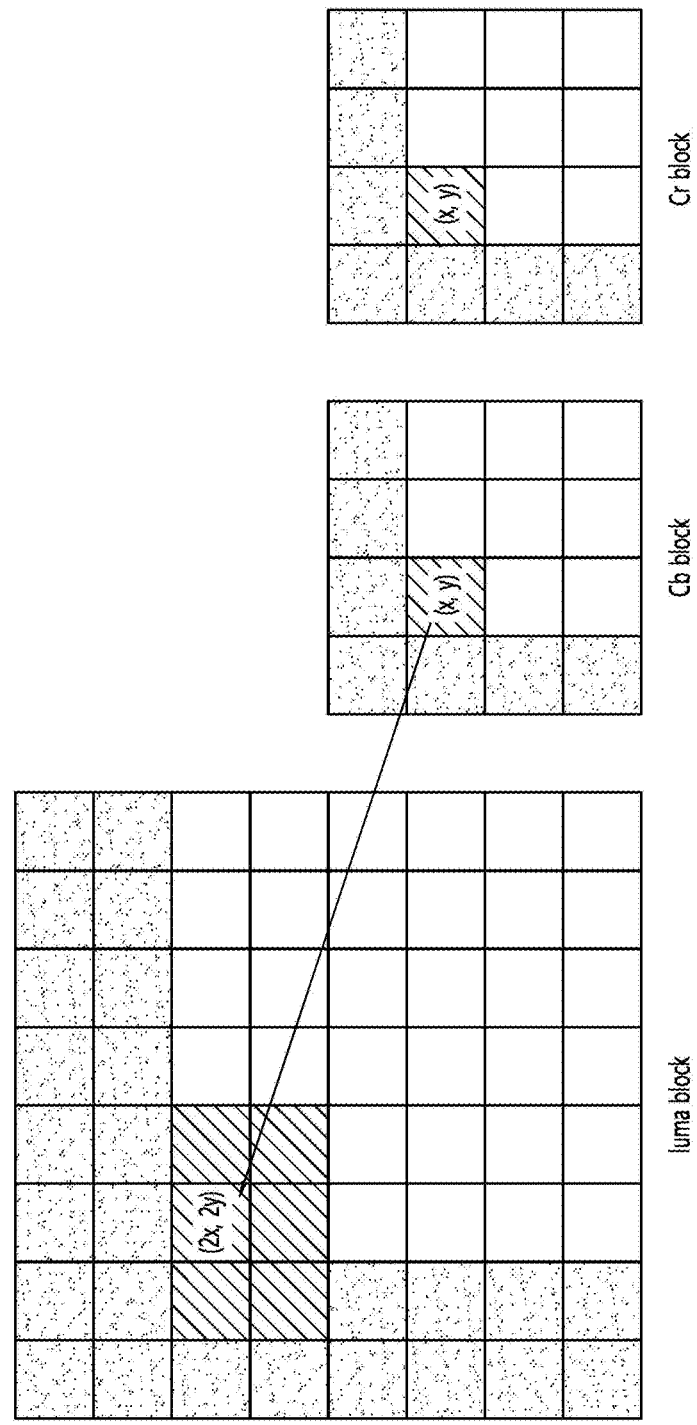
FIG. 3 is a diagram illustrating CCLM-based intra prediction according to an embodiment.

FIG. 3 is a diagram illustrating CCLM-based intra prediction according to an embodiment.

According to an embodiment, when performing intra encoding for a chroma image, a cross-component linear model (CCLM) mode may be used as one of prediction modes. The CCLM is a method of predicting a sample value (or pixel value) of a chroma image (or chroma block) based on a sample value of a reconstructed luma image (or luma block) and is a method using a characteristic in which correlation between a luma image and a chroma image is high.

In one embodiment, intra prediction based on the CCLM mode of Cb and Cr chroma images may be performed based on Equation 1.

$$Predc(x,y) = \alpha \cdot Rec'_L(x,y) + \beta \quad \text{[Equation 1]}$$

Predc (x, y) means a sample value of the Cb or Cr chroma image to be predicted, $Rec'_L(x, y)$ means a sample value of the reconstructed luma block adjusted to a chroma block size, and (x,y) means a coordinate of the sample. In a color format of 4:2:0, because a size of the luma image is two times larger than that of the chroma image, Reef of the chroma block size should be generated through downsampling, and thus a sample of a luma image to be used in the sample value Predc(x, y) of the chroma image may consider a neighboring sample in addition to $Rec_L(2x, 2y)$. In one example, $Rec'_L(x, y)$ may be derived based on a sample value of six neighboring samples, as shown in Equation 2.

$$Rec'_L(x,y) = (2 \times Rec_L(2x,2y) + 2 \times Rec_L(2x,2y+1) + Rec_L(2x-1,2y) + Rec_L(2x+1,2y) + Rec_L(2x-1,2y+1) + Rec_L(2x+1,2y+1) + 4) >> 3 \quad \text{[Equation 2]}$$

In one embodiment, the linear model parameters a and p used when applying the CCLM mode may be derived, as shown in Equation 3 based on the cross-correlation between the Cb or Cr neighboring chroma reference sample area or template and the neighboring luma reference sample area and the difference between the average values, as in a light shaded area of FIG. 3.

$$\alpha = \frac{M(t_L(x, y) - M(t_L)) \times M(t_C(x, y) - M(t_C))}{M(t_L(x, y) - M(t_L)) \times M(t_L(x, y) - M(t_L))}, \quad \text{[Equation 3]}$$

$$\beta = M(t_c) - \alpha M(t_L)$$

In Equation 3, $t_L$ means a neighboring luma reference sample of the luma block corresponding to a current chroma block, $t_{CL}$ means a neighboring reference chroma sample of the chroma block to which encoding is currently applied, and (x, y) means a sample position. Further, M (A) means the average of samples A in the reference sample area. A reference sample of the luma block may also be derived based on downsampling, as in Equation 3.

In another embodiment, when an intra prediction mode of the Cr chroma image is not the CCLM mode, intra prediction may be performed based on a basic intra prediction mode (e.g., the basic intra prediction mode may include a DC mode, a PLANAR mode, and other directional intra prediction modes). Thereafter, a CCLM may be applied between the Cb chroma image and the Cr chroma image, and the result in which the CCLM is applied may be reflected to the existing prediction block, as shown in Equation 3. In this case, it is possible to predict the other one using anyone of the Cb and Cr chroma images, and in an example, when predicting the Cr chroma image using the Cb chroma image, Equation 4 may be used.

$$\begin{cases} pred_{Cr}(x, y) = pre\_pred_{Cr}(x, y) + & \text{if } \alpha < 0 \\ \alpha \cdot residual_{Cr}(x, y) \\ pred_{Cr}(x, y) = pre\_pred_{Cr}(x, y) & \text{otherwise} \end{cases} \quad \text{[Equation 4]}$$

In Equation 4, $pred_{Cr}$ may mean a sample value of the final predicted Cr chroma block, pre_predcr may mean a sample value of the Cr chroma block predicted through a Cr chroma intra prediction mode other than CCLM, and $residual_{Cb}$ may mean a residual sample value (or residual pixel) of a Cb chroma image in which encoding has already been completed. Further, a may be calculated through cross-correlation between neighboring reference sample areas of the Cb and Cr chroma blocks, as in Equation 1.

FIG. 4 is a diagram illustrating CCLM-based intra prediction according to another embodiment.

In an embodiment, when the upper reference sample line of the current (encoding) block is located at the boundary of another coding tree unit (CTU), reference sample downsampling may be performed using only one reference sample line directly above the current block, as in Equation 5 instead of downsampling according to Equation 2.

$$Rec'_L(x,y) = (2 \times Rec_L(2x,2y+1) + Rec_L(2x-1,2y+1) + Rec_L(2x+1,2y+1) + 2) >> 2 \quad \text{[Equation 5]}$$

That is, as shown in Equation 2, downsampling of samples of the luma block for a CCLM uses 6 samples (or pixels), but in one embodiment according to Equation 5, when the upper reference sample line of the current block is located at the boundary of another CTU (or in case of overlapping with the boundary of another CTU), downsampling may be performed using three samples of one reference sample line.

In hardware implementation, because a line buffer should include both sample (or pixel) data and compression information of an entire horizontal size of an image, the more the line buffer is used, the higher the cost may be. According to the method proposed in an embodiment according to Equation 5, CCLM prediction may be performed using only one line of line buffers at the upper CTU boundary and thus by reducing the line buffer used at the upper CTU boundary to (half), the cost of hardware implementation may be reduced.

Table 1 shows an example of experimental results when using the method proposed in an embodiment according to FIG. 4 and Equation 5. In one example, an anchor of the experiment may be software in which CCLM technology is added to VTM1.0 and represents the result in which an image is encoded with all intra setting.

TABLE 1

|          | Y      | U      | V      |
|----------|--------|--------|--------|
| Class A1 | −0.01% | 0.07%  | 0.00%  |
| Class A2 | 0.00%  | 0.06%  | 0.05%  |
| Class B  | 0.00%  | −0.02% | 0.06%  |
| Class C  | 0.01%  | −0.11% | 0.02%  |
| Class E  | 0.00%  | 0.05%  | −0.10% |
| Overall  | 0.00%  | 0.00%  | 0.01%  |
| Class D  | −0.03% | −0.03% | 0.04%  |

Referring to Table 1, when a CCLM mode is applied using the method proposed in an embodiment according to Equation 5 of FIG. 4, compared with a case in which the CCLM mode is applied without using the method proposed in an embodiment according to Equation 5, BD-rates of luma (Y) image 0.00%, chroma image Cb 0.00%, and chroma image Cr 0.01% may be obtained. That is, even when the CCLM mode is applied using the method proposed in the embodiment according to Equation 5 of FIG. 4, it may be determined that an encoding loss does not occur.

In addition to the downsampling method proposed in Equation 5, in one embodiment, the CCLM mode may be applied based on a downsampling method such as Equation 6 or Equation 7.

$$Rec'_L(x,y)=(3 \times Rec_L(2x,2y+1) \times Rec_L(2x+1,2y+1)+2)>>2 \quad \text{[Equation 6]}$$

$$Rec'_L(x,y)=Rec_L(2x,2y+1) \quad \text{[Equation 7]}$$

The downsampling methods according to Equations 2 and 5 to 7 may be applied to the CCLM mode, which is a chroma intra prediction mode, and the chroma block predicted through the CCLM mode may be used when obtaining a residual image (or residual image) through the difference with an original video in the encoding apparatus (or encoder) or may be used when obtaining a reconstructed image based on the sum with the residual signal in the decoding apparatus (or decoder).

Figure 5:
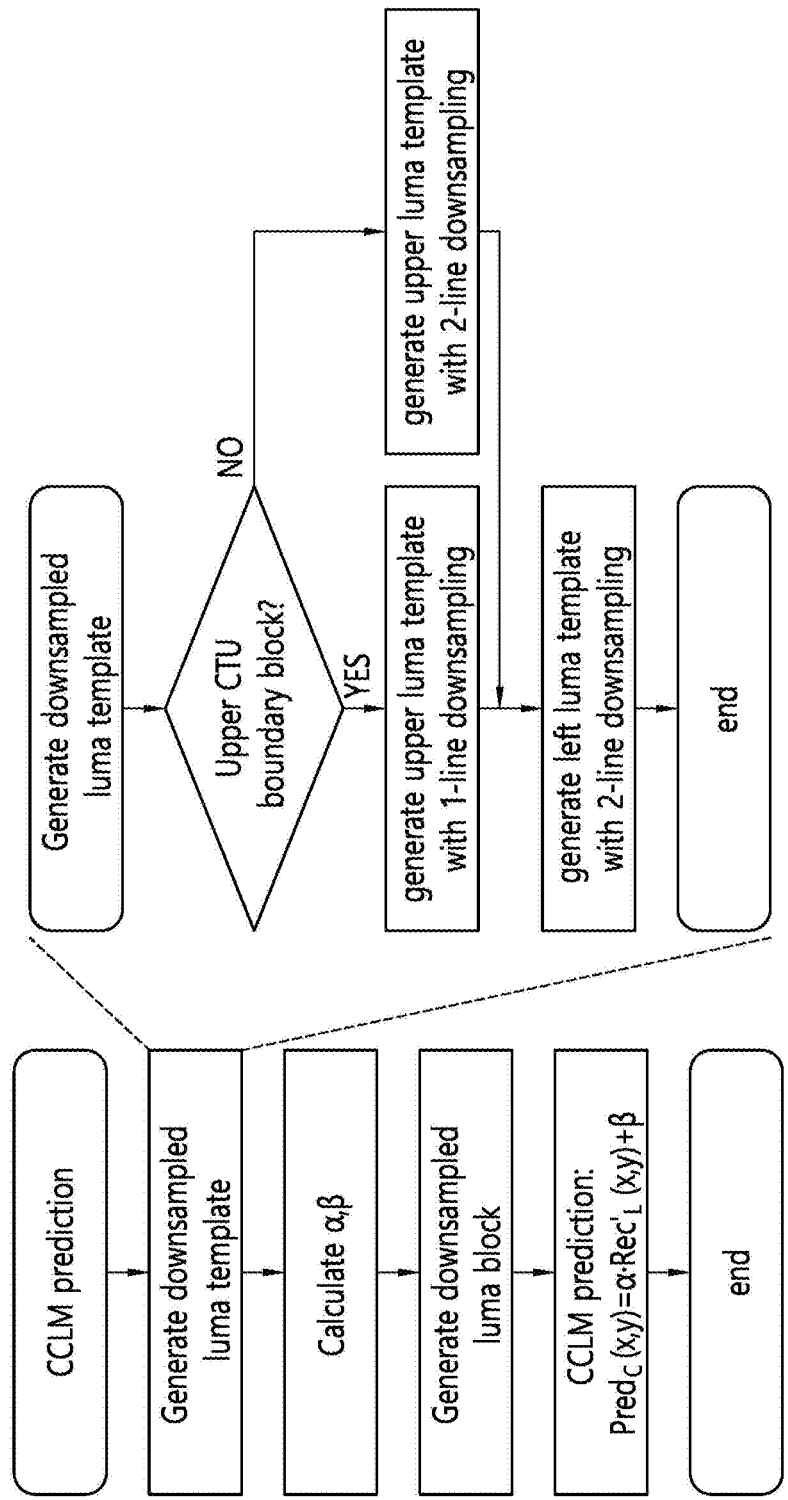
FIG. 5 is a flowchart illustrating an intra prediction process based on CCLM according to an embodiment.

FIG. 5 is a flowchart illustrating an intra prediction process based on a CCLM according to an embodiment.

The decoding apparatus 200 according to an embodiment may generate a down-sampled luma template. In this case, the decoding apparatus 200 may determine whether a top boundary of a current block overlaps with a boundary of the CTU, generate an upper luma template based on 1-line downsampling, if a top boundary of a current block overlaps with a boundary of the CTU, and generate an upper luma template based on 2-line downsampling, if a top boundary of the current block does not overlap with a boundary of the CTU. The decoding apparatus 200 may generate a left luma template based on 2-line downsampling.

The decoding apparatus 200 according to an embodiment may derive α and β, which are linear parameter model coefficients, generate down-sampled luma blocks, and perform CCLM prediction based on Equation 1.

Figure 6:
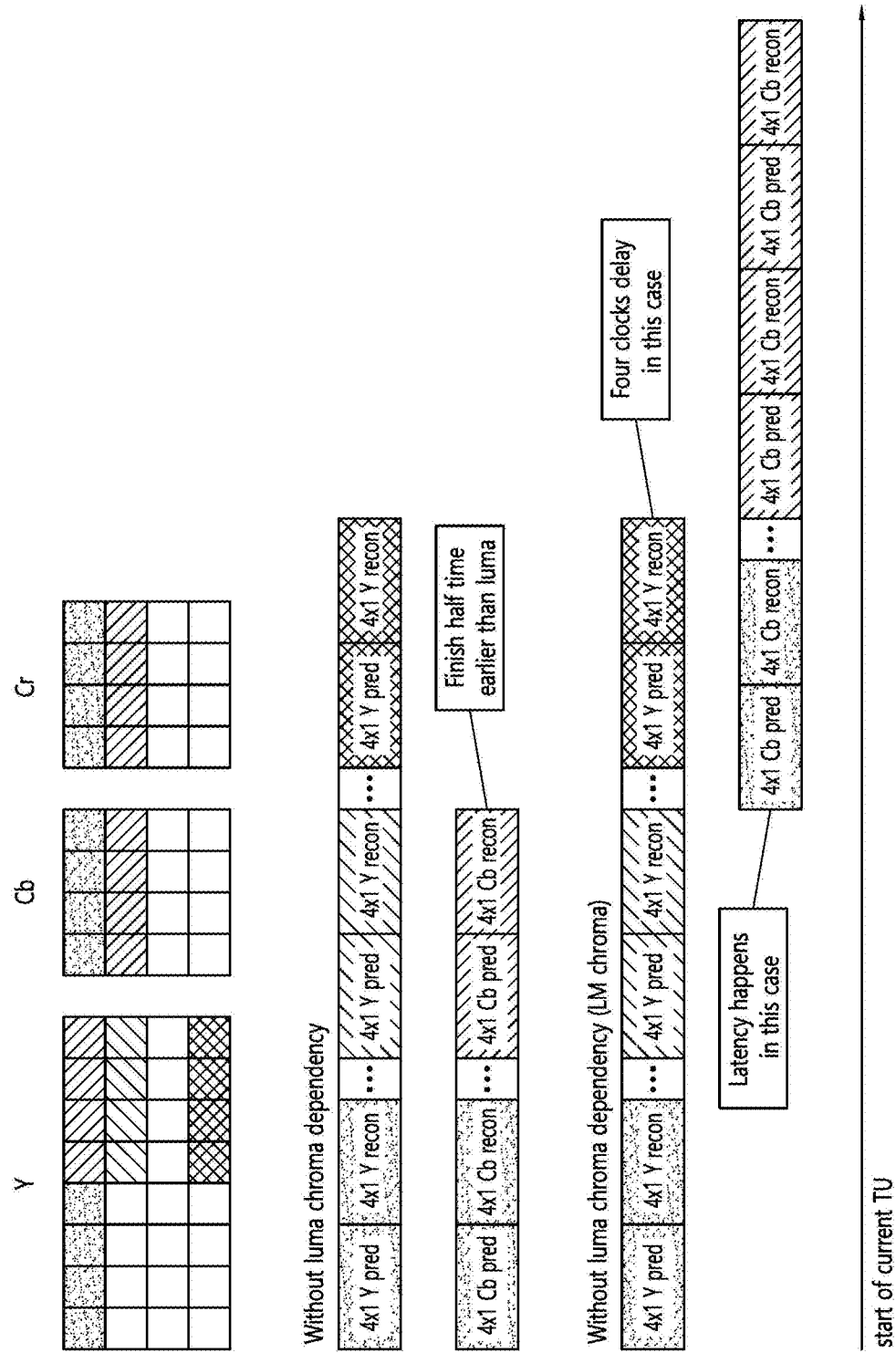
FIG. 6 is a diagram illustrating an example of a hardware pipeline of CCLM-based intra prediction according to an embodiment.

FIG. 6 is a diagram illustrating an example of a hardware pipeline of CCLM-based intra prediction according to an embodiment.

In one embodiment, for hardware pipelining optimization of intra prediction implemented with a CCLM, when downsampling a reconstructed luma image, a method of removing correlation between sample lines of a block is proposed.

As described above, because a CCLM is a method of predicting a sample value of a chroma block using a sample value of a reconstructed luma block, CCLM prediction of a chroma block may not be possible until encoding of the luma block of the same position is completed.

Further, because downsampling of a reconstructed image is applied through the method of Equation 2, correlation between sample lines of the block occurs and thus when implementing hardware of the CCLM, a clock delay may occur, as shown in FIG. 6.

FIG. 6 illustrates an example of a hardware pipeline according to whether CCLM prediction exists in 8×4 intra prediction blocks. As shown in FIG. 6, prediction and reconstruction of luma samples are performed in units of 4× 1, and two clocks are required to decode 4×1 blocks, and thus total 16 clocks may be required to decode all luma samples of 8×4 blocks. When there is no correlation between the luma and chroma images, the luma and chroma images are decoded at the same time and thus decoding of the chroma images may be completed when a clock (8 clocks in the example of FIG. 6) corresponding to a half of the luma image has elapsed. However, when CCLM algorithm is applied, after encoding of 2-sample lines of the luma block is completed by correlation between the sample lines (fourth 4×1 lines in FIG. 6), a CCLM may be applied to a 1-sample line of the chroma block and thus even when encoding of the luma block is terminated, four clock delays may occur for encoding the chroma block.

Figure 7:
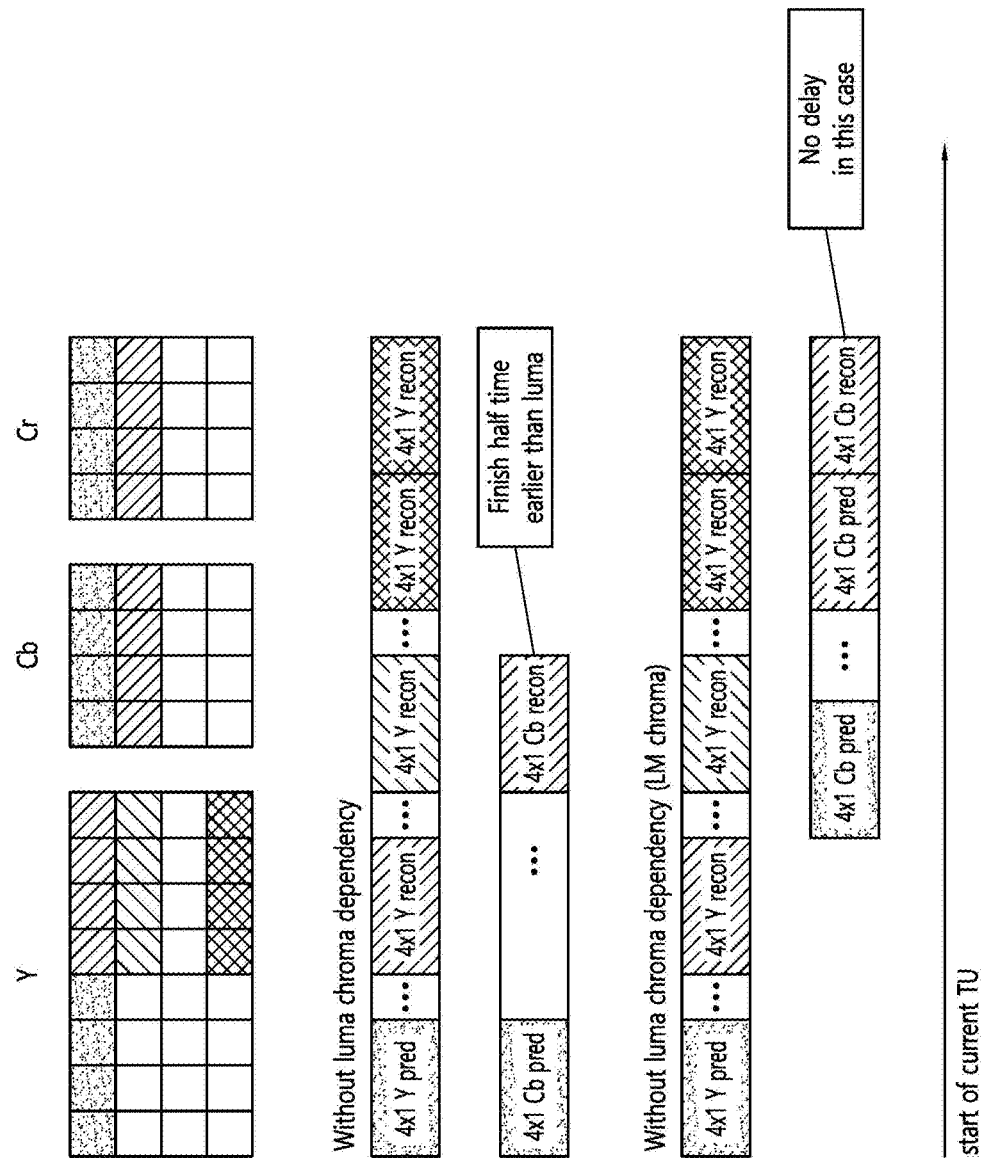
FIG. 7 is a diagram illustrating an example of a hardware pipeline of CCLM-based intra prediction according to another embodiment.

FIG. 7 is a diagram illustrating an example of a hardware pipeline of CCLM-based intra prediction according to another embodiment.

In one embodiment, when downsampling a reconstructed luma image for a CCLM, a method of reducing a clock delay of a hardware pipeline by removing correlation between sample lines may be provided. For this reason, downsampling of the reconstructed luma block may be performed based on Equation 8, Equation 9, Equation 10, or Equation 11.

$$Rec'_L(x,y)=(2 \times Rec_L(2x,2y)+2 \times Rec_L(2x,2y+1)+Rec_L(2x-1,2y)+2)>>2 \quad \text{[Equation 8]}$$

$$Rec'_L(x,y)=(2 \times Rec_L(2x,2y)+2 \times Rec_L(2x+1,2y)+Rec_L(2x-1,2y)+2)>>2 \quad \text{[Equation 9]}$$

$$Rec'_L(x,y)=(3 \times Rec_L(2x,2y)+2 \times Rec_L(2x,2y+1))>>2 \quad \text{[Equation 10]}$$

$$Rec'_L(x,y)=(3 \times Rec_L(2x,2y)+2 \times Rec_L(2x+1,2y))>>2 \quad \text{[Equation 11]}$$

Downsampling proposed in Equations 8 to 11 may be applied to areas other than the current neighboring reference sample area (or neighboring template area).

In an embodiment, when downsampling is performed by removing correlation between sample lines, optimization of a hardware pipeline may be performed as shown in FIG. 7. In the pipeline shown in FIG. 7, after decoding of one sample line of the luma block is completed, decoding of the chroma block may be performed immediately (second 4×1 line of FIG. 7), and after decoding of the third sample line of the luma block is finally completed (sixth 4×1 line of FIG. 7), decoding of the second sample line of the chroma block may be performed. For decoding of the fourth sample line of the luma block, 4 clocks are required, and for decoding of the second sample line of the chroma block, 4 clocks are also required (2 clocks are required for each of chroma Cb and Cr) and thus decoding of luma and chroma blocks may finally be completed at the same time without delay.

That is, a clock delay problem between the luma block and the chroma block can be solved through the method proposed in the present embodiment, which can compensate for the disadvantages of hardware implementation of the CCLM.

The method proposed in the present patent may be used in a CCLM mode, which is a chroma intra prediction mode, and a chroma block predicted through the CCLM mode may be used when obtaining a residual image through a difference from an original image in an encoder or may be used when obtaining a reconstructed image through the sum with a residual signal in a decoder.

Figure 8:
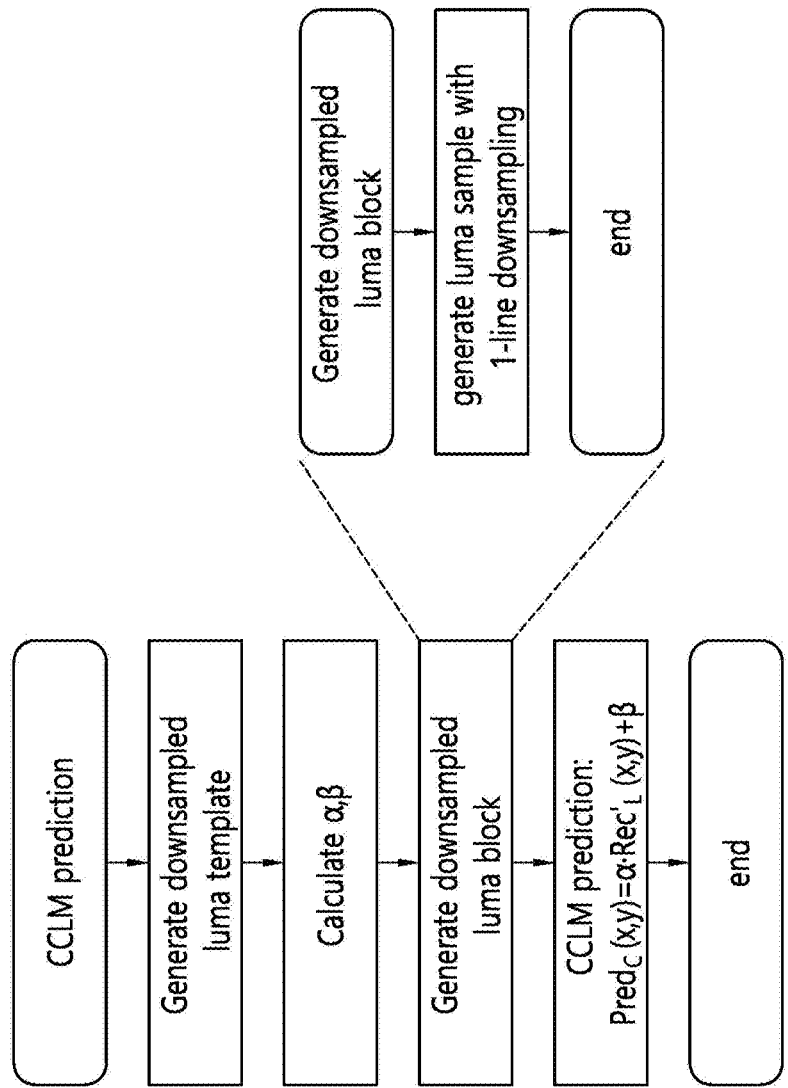
FIG. 8 is a flowchart illustrating an intra prediction process based on a CCLM according to another embodiment.

FIG. 8 is a flowchart illustrating an intra prediction process based on a CCLM according to another embodiment.

The decoding apparatus 200 according to an embodiment may generate a down-sampled luma template and derive linear parameter model coefficients α and β.

The decoding apparatus 200 according to an embodiment may generate a down-sampled luma block. In this case, the decoding apparatus 200 may generate a luma sample based on 1-line downsampling.

The decoding apparatus 200 according to an embodiment may perform CCLM prediction based on Equation 1.

Figure 9:
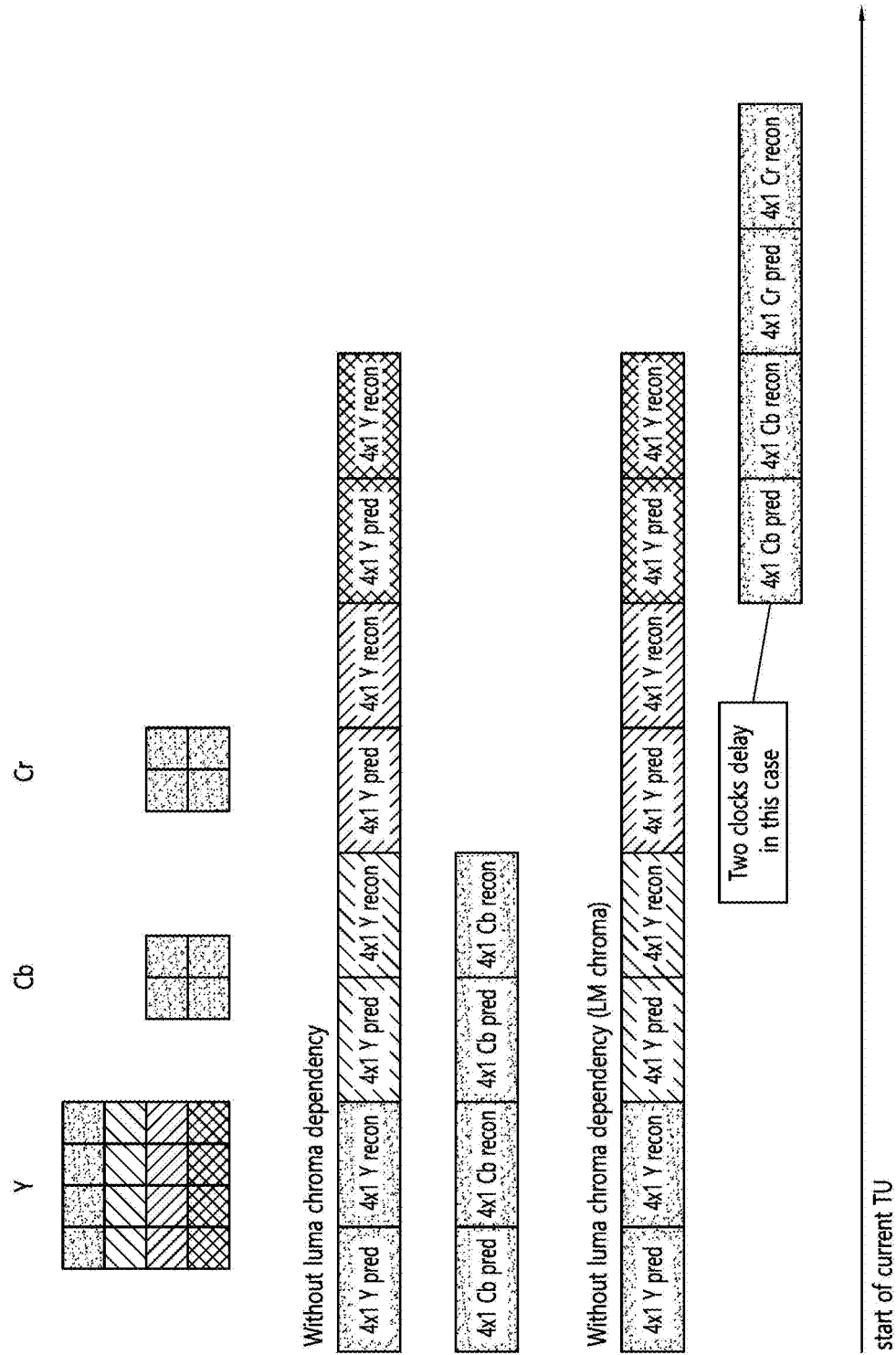
FIG. 9 is a diagram illustrating an example of a hardware pipeline of CCLM-based intra prediction according to another embodiment.

FIG. 9 is a diagram illustrating an example of a hardware pipeline of CCLM-based intra prediction according to another embodiment.

In one embodiment, in order to optimize hardware pipelining of intra prediction in which a CCLM is implemented, when a horizontal length of the chroma block is 2 (or in the case of an image format of 4:4:4, when a horizontal length of the chroma block is 4), a method of not applying a CCLM is proposed.

In intra prediction based on the embodiment of FIG. 7, when a CCLM mode is applied, hardware pipeline optimization may be performed, but when a horizontal length of the luma block is 4, a clock delay may occur. FIG. 9 illustrates an example of a hardware pipeline according to whether there is CCLM prediction in luma 4×4 intra prediction blocks. In FIG. 9, when downsampling the reconstructed luma block by applying the method according to the embodiment of FIG. 7, correlation between sample lines is removed, but it may be determined that a delay of 2 clocks still occurs.

Therefore, in one embodiment, in order to increase hardware implementation affinity of the CCLM mode, when a horizontal length of the chroma block is 2 (or in the case of an image format of 4:4:4, when a horizontal length of the chroma block is 4), a method of not applying a CCLM is proposed. That is, by removing a clock delay, which is a problem in hardware implementation, a hardware incompatibility problem of a CCLM can be solved.

Table 2 shows actual experimental results when using both the method proposed in the embodiment according to FIG. 7 and the embodiment according to FIG. 9. In one example, an anchor of the experiment may be software in which CCLM technology is added to VTM1.0, and represents the result in which an image is encoded with all intra settings.

TABLE 2

|  | Y | U | V |
|---|---|---|---|
| Class A1 | 0.76% | 4.49% | 2.69% |
| Class A2 | 0.13% | 1.66% | 1.08% |
| Class B | 0.08% | 1.50% | 2.23% |
| Class C | 0.39% | 3.39% | 4.02% |
| Class E | 0.02% | 0.21% | 0.26% |

TABLE 2-continued

|  | Y | U | V |
|---|---|---|---|
| Overall | 0.26% | 2.23% | 2.19% |
| Class D | 0.18% | 2.97% | 2.45% |

As shown in Table 2, when using both the methods proposed in the embodiment according to FIG. 7 and in the embodiment according to FIG. 9, a BD-rate of a luma image 0.26% and a chroma image Cb 2.23%/Cr 2.19% may be obtained. Because a CCLM is not applied in 4×N blocks, some performance loss has occurred, but an effect due to a CCLM may be still obtained. (Y −1.28%, Cb −8.03%, Cr −8.67% compared with VTM1.0)

The method proposed in the embodiment according to FIG. 7 and the embodiment according to FIG. 9 may be applied to a CCLM mode, which is a chroma intra prediction mode, and a chroma block predicted through the CCLM mode may be used when obtaining a residual image through the difference with an original image in the encoding apparatus (or encoder) or may be used when obtaining an image reconstructed based on the sum with the residual signal in the decoding apparatus (or decoder).

Figure 10:
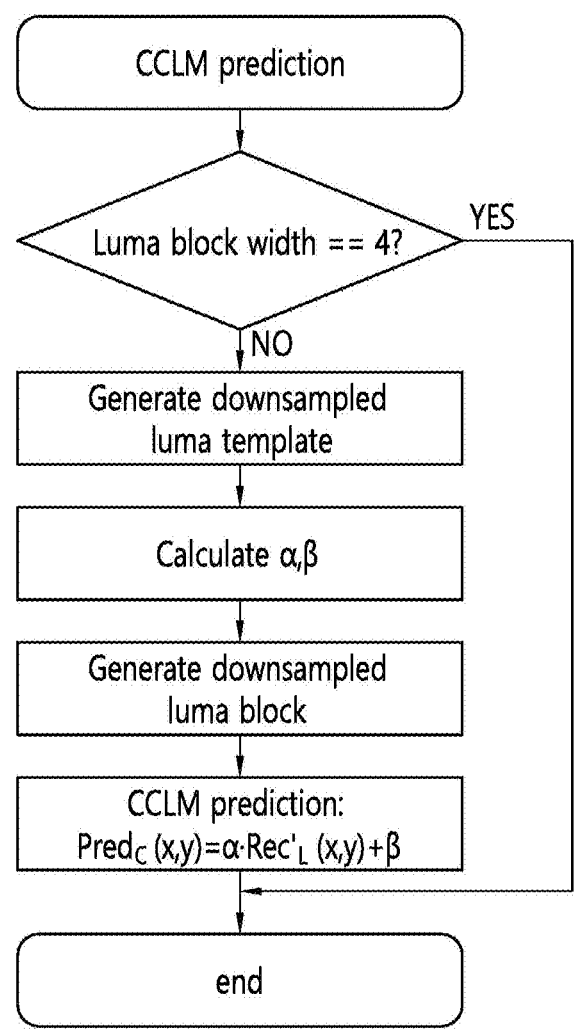
FIG. 10 is a flowchart illustrating an intra prediction process based on a CCLM according to another embodiment.

FIG. 10 is a flowchart illustrating an intra prediction process based on a CCLM according to another embodiment.

When a horizontal length (or width) of the luma block is not 4, the decoding apparatus 200 according to an embodiment may generate a down-sampled luma template, derive linear parameter model coefficients α and β, generate a down-sampled luma block, and perform CCLM prediction based on Equation 1. Conversely, when a horizontal length (or width) of the luma block is 4, the above procedure (a procedure of generating a down-sampled luma template, deriving the linear parameter model coefficients α and β, generating down-sampled luma blocks, and performing CCLM prediction based on Equation 1) may be omitted.

FIG. 11 is a diagram illustrating an intra prediction process based on a CCLM according to another embodiment.

In one embodiment, there is proposed a method of limiting a reference sample line when an upper reference sample line of a current (encoding) block is located at the boundary of another luma/chroma block separation unit block.

In an embodiment, in the case of an I slice, a luma block and a chroma block may be separated and encoding and decoding may be thus performed. In one example, the size of the luma/chroma block separation unit block may be 64×64, but the example is not limited thereto. The luma/chroma block separation unit block may be referred to as virtual pipeline data units (VPDUs).

For pipeline and parallel processing of hardware, correlation between luma/chroma block separation unit blocks needs to be minimized. In one embodiment, for optimized parallel processing, at the top boundary of the luma/chroma block separation unit block, a reconstructed luma reference sample for a CCLM may not be used. That is, as shown in FIG. 11, at the top boundary of the luma/chroma block separation unit block, by using only the left reference sample line for a CCLM, a redundancy issue in the hardware pipeline implementation can be prevented.

Figure 12:
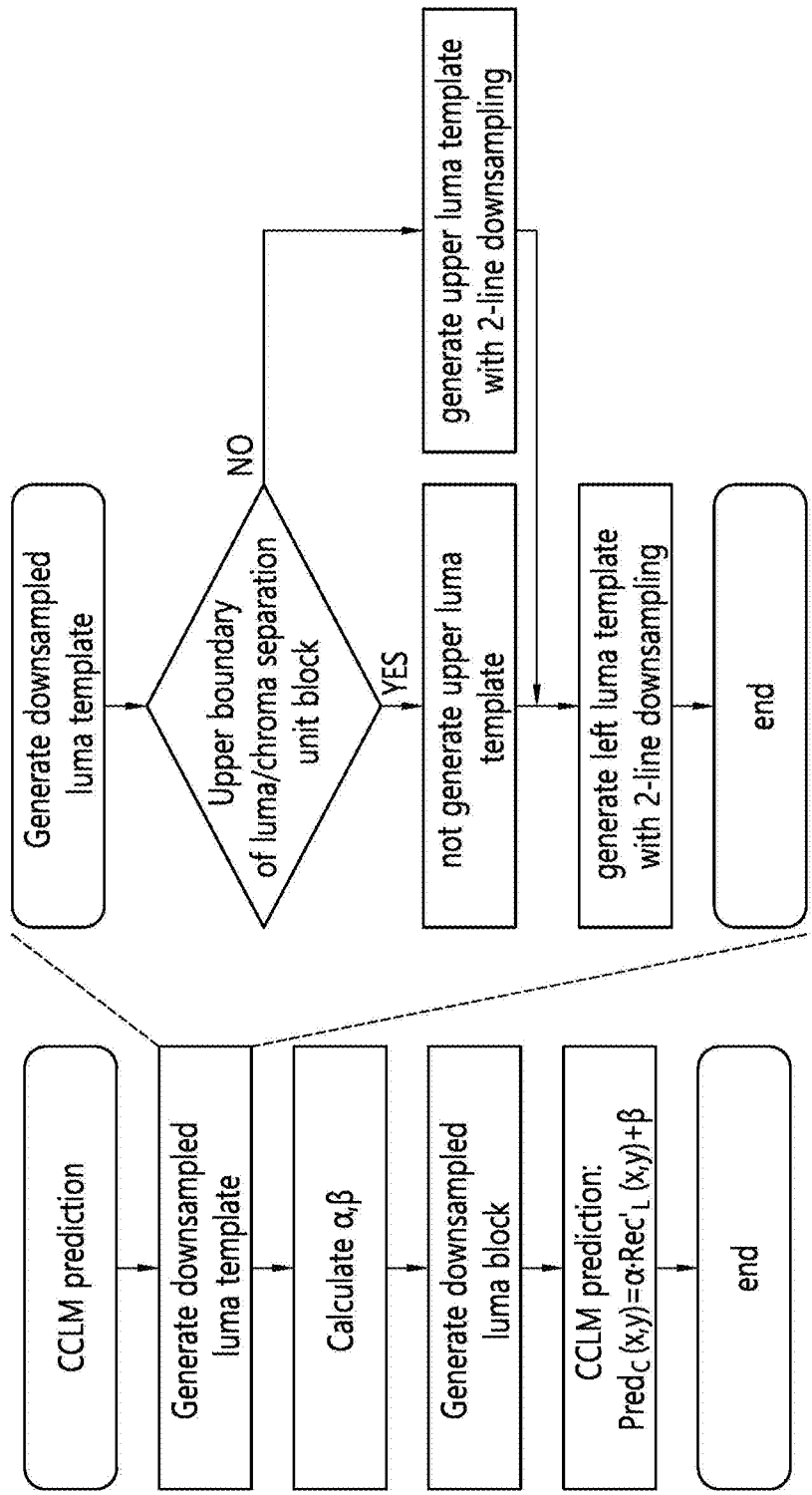
FIG. 12 is a flowchart illustrating an intra prediction process based on a CCLM according to another embodiment.

FIG. 12 is a flowchart illustrating an intra prediction process based on a CCLM according to another embodiment.

The decoding apparatus 200 according to an embodiment may generate a down-sampled luma template. In this case, the decoding apparatus 200 may determine whether the top boundary of the current block overlaps with the boundary of the luma/chroma block separation unit block, and if the top boundary of the current block overlaps with the boundary of the luma/chroma block separation unit block, the decoding apparatus 200 may not generate an upper luma template, and if the top boundary of the current block does not overlap with the boundary of the luma/chroma block separation unit block, the decoding apparatus 200 may generate an upper luma template based on 2-line downsampling. The decoding apparatus 200 may generate a left luma template based on 2-line downsampling.

The decoding apparatus 200 according to an embodiment may derive a and R, which are linear parameter model coefficients, generate down-sampled luma blocks, and perform CCLM prediction based on Equation 1.

Figure 13:
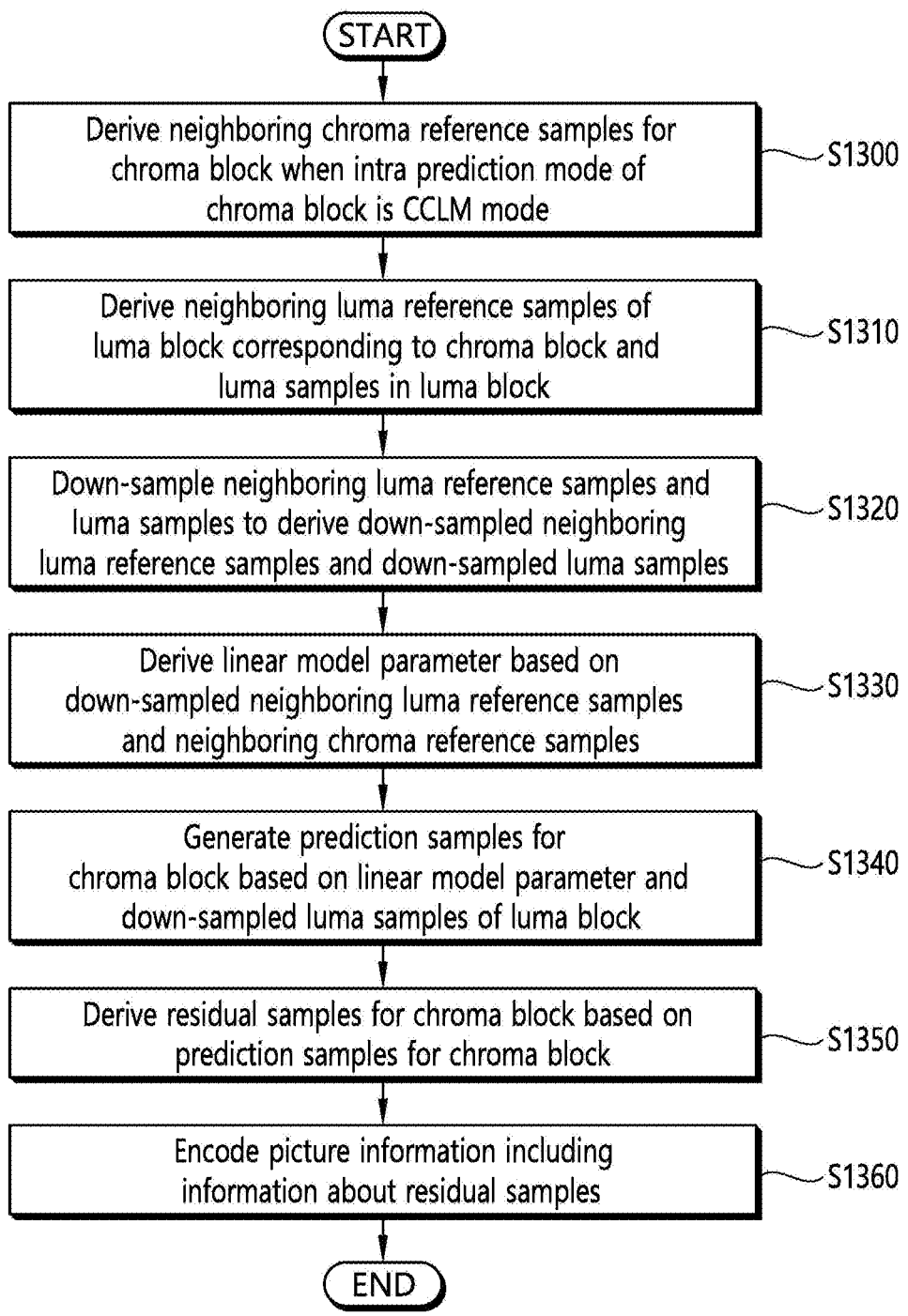
FIG. 13 is a flowchart illustrating an operation of an encoding apparatus according to an embodiment.
Figure 14:
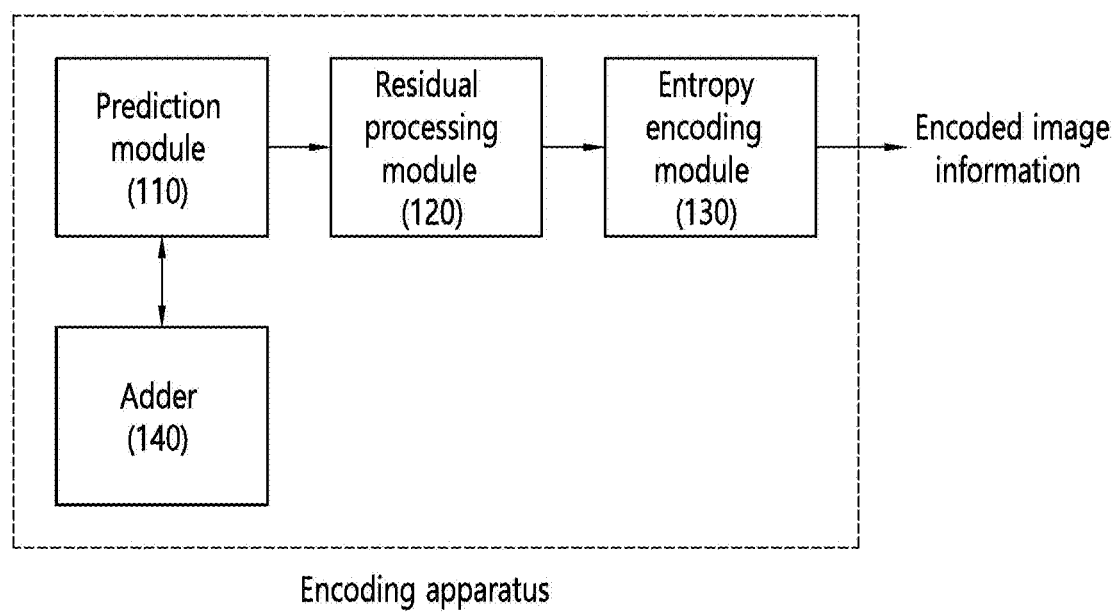
FIG. 14 is a block diagram illustrating a configuration of an encoding apparatus according to an embodiment.

FIG. 13 is a flowchart illustrating an operation of an encoding apparatus according to an embodiment, and FIG. 14 is a block diagram illustrating a configuration of an encoding apparatus according to an embodiment.

The encoding apparatus according to FIGS. 13 and 14 may perform operations corresponding to the decoding apparatus according to FIGS. 15 and 16 to be described later. Accordingly, contents to be described later with reference to FIGS. 15 and 16 may be similarly applied to the encoding apparatus according to FIGS. 13 and 14.

Each step disclosed in FIG. 13 may be performed by the encoding apparatus 100 disclosed in FIG. 1. More specifically, S1300 and S1310 may be performed by the adder 140 disclosed in FIG. 1, S1320 to S1340 may be performed by the prediction module 110 disclosed in FIG. 1, S1350 may be performed by the residual processing module 120 disclosed in FIG. 1, and S1360 may be performed by the entropy encoding module 130 disclosed in FIG. 1. In addition, operations according to S1300 to S1360 are performed based on some of the contents described above with reference to FIGS. 3 to 12. Accordingly, a detailed description repeated with those described above with reference to FIGS. 1 and 3 to 12 will be omitted or simply described.

As shown in FIG. 14, an encoding apparatus according to an embodiment may include a prediction module 110, a residual processing module 120, an entropy encoding module 130, and an adder 140. However, in some cases, all of the components shown in FIG. 14 may not be essential components of the encoding apparatus, and the encoding apparatus may be implemented by more or less components than those illustrated in FIG. 14. For example, the encoding apparatus may further include a memory 160.

In the encoding apparatus according to an embodiment, the prediction module 110, the residual processing module 120, the entropy encoding module 130, and the adder 140 may be each implemented into separate chips or at least two components may be implemented through one chip.

When an intra prediction mode of the chroma block is a CCLM mode, the encoding apparatus according to an embodiment may derive neighboring chroma reference samples for the chroma block (S1300). More specifically, when an intra prediction mode of the chroma block is a CCLM mode, the adder 140 of the encoding apparatus may derive neighboring chroma reference samples for the chroma block.

The encoding apparatus according to an embodiment may derive neighboring luma reference samples of the luma block corresponding to the chroma block and luma samples in the luma block (S1310). More specifically, the prediction module 110 of the encoding apparatus may derive neighboring luma reference samples of the luma block corresponding to the chroma block and luma samples in the luma block.

The encoding apparatus according to an embodiment may down-sample the neighboring luma reference samples and the luma samples to derive the down-sampled neighboring luma reference samples and the down-sampled luma samples (S1320). More specifically, the prediction module 110 of the encoding apparatus may down-sample the neighboring luma reference samples and the luma samples to derive the down-sampled neighboring luma reference samples and the down-sampled luma samples.

In one embodiment, when the top boundary of the luma block overlaps with a boundary of a coding tree unit (CTU), the number of the top neighboring luma reference samples used for deriving the down-sampled neighboring luma reference samples among the neighboring luma reference samples may be less than that of the left neighboring luma reference samples used for deriving the down-sampled neighboring luma reference samples.

The encoding apparatus according to an embodiment may derive a linear model parameter based on the down-sampled neighboring luma reference samples and the neighboring chroma reference samples (S1330). More specifically, the prediction module 110 of the encoding apparatus may derive a linear model parameter based on the down-sampled neighboring luma reference samples and the neighboring chroma reference samples.

The encoding apparatus according to an embodiment may generate prediction samples for the chroma block based on the linear model parameter and the down-sampled luma samples of the luma block (S1340). More specifically, the prediction module 110 of the encoding apparatus may generate prediction samples for the chroma block based on the linear model parameter and the down-sampled luma samples of the luma block.

The encoding apparatus according to an embodiment may derive residual samples for the chroma block based on the prediction samples for the chroma block (S1350). More specifically, the residual processing module 120 of the encoding apparatus may derive the residual samples for the chroma block based on the prediction samples for the chroma block.

The encoding apparatus according to an embodiment may encode picture information including information about the residual samples (S1360). More specifically, the entropy encoding module 130 of the encoding apparatus may encode picture information including information about the residual samples.

According to the encoding apparatus disclosed in FIGS. 13 and 14 and an operation method of the encoding apparatus, when an intra prediction mode of the chroma block is a CCLM mode, the encoding apparatus may derive neighboring chroma reference samples for the chroma block (S1300), derive neighboring luma reference samples of the luma block corresponding to the chroma block and luma samples in the luma block (S1310), down-sample the neighboring luma reference samples and the luma samples to derive the down-sampled neighboring luma reference samples and down-sampled luma samples (S1320), derive a linear model parameter based on the down-sampled neighboring luma reference samples and the neighboring chroma reference samples (S1330), generate prediction samples for the chroma block based on the linear model parameter and the down-sampled luma samples of the luma block (S1340), derive residual samples for the chroma block based on the prediction samples for the chroma block (S1350), and encode picture information including information about the residual samples (S1360), wherein the neighboring luma reference samples include top neighboring luma reference samples located at the upper side of the top boundary of the luma block and left neighboring luma reference samples located at the left side of the left boundary of the luma block, and when the top boundary of the luma block overlaps with a boundary of a coding tree unit (CTU), the number of the top neighboring luma reference samples used for deriving the down-sampled neighboring luma reference samples among the neighboring luma reference samples may be less than that of the left neighboring luma reference samples used for deriving the down-sampled neighboring luma reference samples. That is, when performing CCLM-based intra prediction, by downsampling the neighboring luma reference samples of a 1-sample line, image coding efficiency can be improved, and when implementing CCLM-based intra prediction in hardware, a pipeline delay can be improved.

Figure 15:
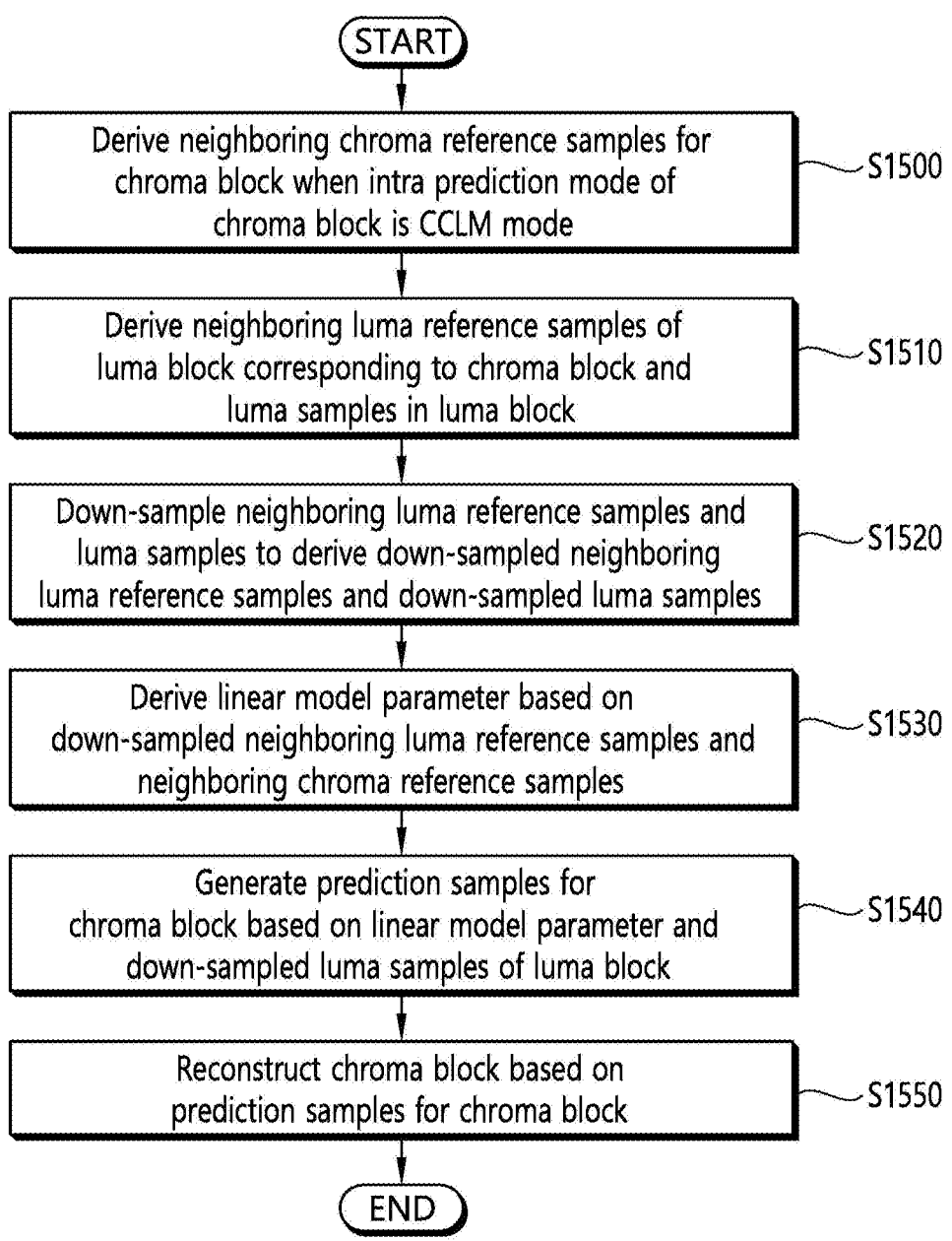
FIG. 15 is a flowchart illustrating an operation of a decoding apparatus according to an embodiment.
Figure 16:
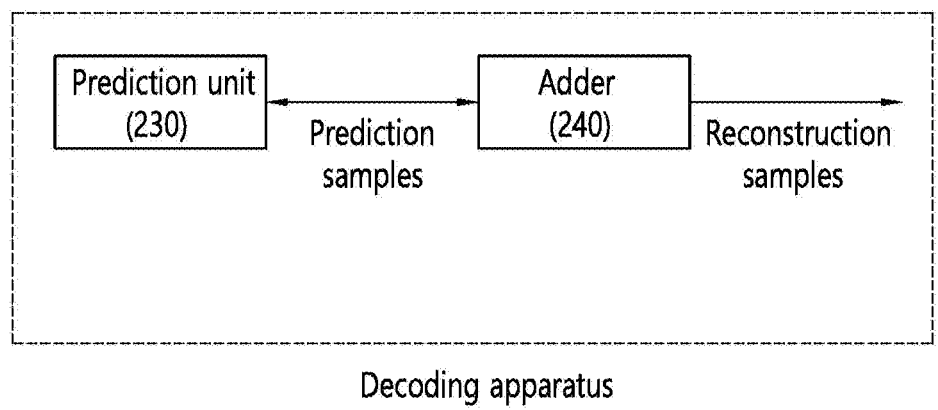
FIG. 16 is a block diagram illustrating a configuration of a decoding apparatus according to an embodiment.

FIG. 15 is a flowchart illustrating an operation of a decoding apparatus according to an embodiment, and FIG. 16 is a block diagram illustrating a configuration of a decoding apparatus according to an embodiment.

Each step disclosed in FIG. 15 may be performed by the decoding apparatus 200 disclosed in FIG. 2. More specifically, S1500, S1510, and S1550 may be performed by the adder 240 disclosed in FIG. 2, and S1510 to S1540 may be performed by the prediction module 230 disclosed in FIG. 2. In addition, operations according to S1500 to S1550 are performed based on some of the contents described above with reference to FIGS. 3 to 12. Therefore, a detailed description repeated with the above description in FIGS. 2 to 12 will be omitted or simply described.

As shown in FIG. 16, the decoding apparatus according to an embodiment may include a prediction module 230 and an adder 240. However, in some cases, all of the components shown in FIG. 16 may not be essential components of the decoding apparatus, and the decoding apparatus may be implemented by more or less components than those illustrated in FIG. 16. In one example, the decoding apparatus may further include a memory 260.

In the decoding apparatus according to an embodiment, the prediction module 230 and the adder 240 may be each implemented into separate chips or at least two components may be implemented through one chip.

When an intra prediction mode of the chroma block is a CCLM mode, the decoding apparatus according to an embodiment may derive neighboring chroma reference samples for the chroma block (S1600). More specifically, when the intra prediction mode of the chroma block is a CCLM mode, the adder 240 of the decoding apparatus may derive (or reconstruct) neighboring chroma reference samples for the chroma block.

The decoding apparatus according to an embodiment may derive neighboring luma reference samples of the luma block corresponding to the chroma block and luma samples in the luma block (S1610). More specifically, the prediction module 230 and/or the adder 240 of the decoding apparatus may derive neighboring luma reference samples of the luma block corresponding to the chroma block and luma samples in the luma block.

The decoding apparatus according to an embodiment may down-sample the neighboring luma reference samples and the luma samples to derive the down-sampled neighboring luma reference samples and the down-sampled luma samples (S1620). More specifically, the prediction module 230 of the decoding apparatus may down-sample the neighboring luma reference samples and the luma samples to derive the down-sampled neighboring luma reference samples and the down-sampled luma samples.

In one embodiment, the neighboring luma reference samples include top neighboring luma reference samples located at the upper side of a top boundary of the luma block and left neighboring luma reference samples located at the left side of a left boundary of the luma block, and when the top boundary of the luma block overlaps with the boundary of a coding tree unit (CTU), the number of the top neighboring luma reference samples used for deriving the down-sampled neighboring luma reference samples among the neighboring luma reference samples may be less than that of the left neighboring luma reference samples used for deriving the down-sampled neighboring luma reference samples.

In an embodiment, when the top boundary of the luma block overlaps with the boundary of the CTU, the top neighboring luma reference samples may be included in a horizontal 1-sample line located at the upper side of the luma block. Further, the left neighboring luma reference samples may be included in a plurality of horizontal or vertical sample lines at the left side of the luma block. For example, the left neighboring luma reference samples may be included in horizontal two-sample lines at the left side of the luma block or may be included in vertical three-sample lines at the left side of the luma block, but the example is not limited thereto.

In one embodiment, the down-sampled neighboring luma reference samples include down-sampled left neighboring luma reference samples and down-sampled top neighboring luma reference samples, and when the top boundary of the luma block overlaps with a boundary of the CTU, the number of the top neighboring luma reference samples used for deriving one down-sampled top neighboring luma reference sample may be three, and the number of the left neighboring luma reference samples used for deriving one down-sampled left neighboring luma reference sample may be six.

In one embodiment, when a coordinate of the down-sampled top neighboring luma reference sample is (x, −1), the three top neighboring luma reference samples may be located at coordinates (2*x−1, −1), (2*x, −1) and (2*x+1, −1), respectively.

In one embodiment, when the down-sampled top neighboring luma reference sample has a coordinate of (0, −1) and there is a sample value of a luma reference sample corresponding to a coordinate (−1, −1), the three top neighboring luma reference samples may be located at coordinates (−1, −1), (0, −1) and (1, −1), respectively.

In one embodiment, when the down-sampled top neighboring luma reference sample has a coordinate of (0, −1) and there is no sample value of the luma reference sample corresponding to the coordinate (−1, −1), in order to derive the down-sampled top neighboring luma reference sample, one top neighboring luma reference sample may be used, and a sample value of the down-sampled top neighboring luma reference sample may be determined as a sample value of the top neighboring luma reference sample located at a coordinate (0, −1).

In one embodiment, the linear model parameter may include a first linear model parameter representing a scaling factor and a second linear model parameter representing offset.

The decoding apparatus according to an embodiment may derive a linear model parameter based on the down-sampled neighboring luma reference samples and the neighboring chroma reference samples (S1630). More specifically, the prediction module 230 of the decoding apparatus may derive a linear model parameter based on the down-sampled neighboring luma reference samples and the neighboring chroma reference samples.

The decoding apparatus according to an embodiment may generate prediction samples for the chroma block based on the linear model parameter and the down-sampled luma samples of the luma block (S1640). More specifically, the prediction module 230 of the decoding apparatus may generate prediction samples for the chroma block based on the linear model parameter and the down-sampled luma samples of the luma block.

The decoding apparatus according to an embodiment may reconstruct the chroma block based on the prediction samples for the chroma block (S1650). More specifically, the adder 240 of the decoding apparatus may reconstruct the chroma block based on the prediction samples for the chroma block.

In one embodiment, in the present specification, CCLM-based intra prediction described above may be implemented, for example, according to the following spec.

Abstract

This embodiments provides the experimental results of CCLM line buffer restriction Experimental results from All Intra configuration show 0.01%, 0.01%, and 0.04% bit-rate increase compared to VTM2.0.1 on Y, Cb, and Cr components, respectively.

1) Proposed Method

The CCLM (cross-component linear model) method in the current VVC specification always uses 2 lines of reconstructed luma reference samples to get the down-sampled collocated luma. In this proposal, to avoid the line buffer increase in the intra prediction, only one luma line (general line buffer in intra prediction) is used to make the down-sampled luma samples when the upper reference line is at the CTU boundary.

2) Experimental Results

The proposed method has been implemented using BMS-2.0.1 as software base and experimentally evaluated for VTM test according to the common test conditions defined in JVET-K1010 and Core Experiment description in JVET-K1023. For the VTM based test, the VTM configuration was enabled.

Table 3 and Table 4 show the test results in AI and RA configuration.

TABLE 1

Experimental results of Test1 for all-intra
(AI) test condition; anchor is VTM2.0.1

|  | All Intra Main10 Over VTM-2.0.1 | | | | |
|---|---|---|---|---|---|
|  | Y | U | V | EncT | DecT |
| Class A1 | 0.00% | −0.04% | 0.04% | 100% | 99% |
| Class A2 | 0.01% | 0.06% | −0.03% | 100% | 100% |
| Class B | 0.01% | 0.03% | 0.07% | 100% | 98% |
| Class C | 0.00% | 0.01% | 0.09% | 100% | 101% |
| Class E | 0.01% | −0.04% | 0.01% | 100% | 101% |
| Overall | 0.01% | 0.01% | 0.04% | 100% | 100% |
| Class D | 0.00% | 0.00% | −0.03% | 100% | 96% |

TABLE 4

Experimental results of Test1 for random-access
(RA) test condition; anchor is VTM2.0.1

|  | Random Access Main 10 Over VTM-2.0.1 | | | | |
|---|---|---|---|---|---|
|  | Y | U | V | EncT | DecT |
| Class A1 | −0.03% | 0.17% | 0.07% | 100% | 100% |
| Class A2 | 0.01% | −0.08% | −0.01% | 99% | 99% |
| Class B | 0.03% | 0.04% | 0.04% | 100% | 100% |
| Class C | 0.02% | 0.16% | −0.03% | 100% | 100% |
| Class E |  |  |  |  |  |
| Overall | 0.01% | 0.08% | 0.02% | 100% | 100% |
| Class D | 0.02% | −0.16% | −0.16% | 99% | 94% |

Specification of INTRA_CCLM intra prediction mode with proposed method

Inputs to this process are:

a chroma location (xCbC, yCbC) of the top-left sample of the current coding block relative to the top-left sample of the current picture, a sample location (xTbC, yTbC) of the top-left sample of the current transform block relative to the top-left sample of the current picture, a variable nTbW specifying the transform block width, a variable nTbH specifying the transform block height, chroma neighbouring samples p[x][y], with x=−1, y=0 . . . nTbH−1 and x=0 . . . nTbW−1, y=−1.

Output of this process are predicted samples predSamples[x][y], with x=0 . . . nTbW−1, y=0 . . . nTbH−1.

The current luma location (xTbY, yTbY) is derived as follows:

$(xTbY, yTbY) = (xTbC << 1, yTbC << 1)$

The variables availL, availT and availTL are derived as follows:

The availability of left neighbouring samples derivation process for a block as specified in clause 6.4.X [Ed. (BB): Neighbouring blocks availability checking process tbd] is invoked with the current luma location (xCurr, yCurr) set equal to (xTbY, yTbY) and the neighbouring luma location (xTbY−1, yTbY) as inputs, and the output is assigned to availL.

The availability of top neighbouring samples derivation process for a block as specified in clause 6.4.X [Ed. (BB): Neighbouring blocks availability checking process tbd] is invoked with the current luma location (xCurr, yCurr) set equal to (xTbY, yTbY) and the neighbouring luma location (xTbY, yTbY−1) as inputs, and the output is assigned to availT.

The availability of top-left neighbouring samples derivation process for a block as specified in clause 6.4.X [Ed. (BB): Neighbouring blocks availability checking process tbd] is invoked with the current luma location (xCurr, yCurr) set equal to (xTbY, yTbY) and the neighbouring luma location (xTbY−1, yTbY−1) as inputs, and the output is assigned to availTL.

The variable bCTUboudary is derived as follows:

$bCTUboudary = yCbC \,\&\, ((1 << (Ctb \, Log \, 2SizeY - 1)) - 1) == 0$

The prediction samples predSamples[x][y] with x=0 . . . nTbW−1, y=0 . . . nTbH−1 are derived as follows:

If both availL and availT are equal to FALSE, the following applies:

$predSamples[x][y] = 1 << (BitDepthC - 1)$

Otherwise, the following ordered steps apply:

1. The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).

The neighbouring luma samples samples pY[x][y] are derived as follows:

When availL is equal to TRUE, the neighbouring left luma samples pY[x][y] with x=−1 . . . −3, y=0 . . . 2*nTbH−1, are set equal to the reconstructed luma samples prior to the deblocking filter process at the locations (xTbY+x, yTbY+y).

When availT is equal to TRUE, the neighbouring top luma samples pY[x][y] with x=0 . . . 2*nTbW−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

3. The down-sampled collocated luma samples pDsY[x][y] with x=0 . . . nTbW−1, y=0 . . . nTbH−1 are derived as follows:

pDsY[x][y] with x=1 . . . nTbW−1, y=0 . . . nTbH−1 is derived as follows:

$$pDsY[x][y]=(pY[2*x-1][2*y]+pY[2*x-1][2*y+1]+ 2*pY[2*x][2*y]+2*pY[2*x][2*y+1]+pY[2*x+1] [2*y]+pY[2*x+1][2*y+1]+4)>>3$$

If availL is equal to TRUE, pDsY[0][y] with y=0 . . . nTbH−1 is derived as follows:

$$pDsY[0][y]=(pY[-1][2*y]+pY[-1][2*y+1]+2*pY[0] [2*y]+2*pY[0][2*y+1]+pY[1][2*y]+pY[1][2*y+ 1]+4)>>3$$

Otherwise, pDsY[0][y] with y=0 . . . nTbH−1 is derived as follows:

$$pDsY[0][y]=(pY[0][2*y]+pY[0][2*y+1]+1)>>1$$

4. When availL is equal to TRUE, the down-sampled neighbouring left luma samples pLeftDsY[y] with y=0 . . . nTbH−1 are derived as follows:

$$pLeftDsY[y]=(pY[-1][2*y]+pY[-1][2*y+1]+2*pY[-2] [2*y]+2*pY[-2][2*y+1]+pY[-3][2*y]+pY[-3] [2*y+1]+4)>>3$$

5. When availT is equal to TRUE and bCTUboudary is equal to FALSE, the down-sampled neighbouring top luma samples pTopDsY[x] with x=0 . . . nTbW−1 are specified as follows:

pTopDsY[x] with x=1 . . . nTbW−1 is derived as follows:

$$pTopDsY[x]=(pY[2*x-1][-2]+pY[2*x-1][-1]+2*pY [2*x][-2]+2*pY[2*x][-1]+pY[2*x+1][-2]+pY [2*x+1][-1]+4)>>3$$

If availTL is equal to TRUE, pTopDsY[0] is derived as follows:

$$pTopDsY[0]=(pY[-1][-2]+pY[-1][-1]+2*pY[0][-2]+ 2*pY[0][-1]+pY[1][-2]+pY[1][-1]+4)>>3$$

Otherwise, pTopDsY[0] is derived as follows:

$$pTopDsY[0]=(pY[0][-2]+pY[0][-1]+1)>>1$$

6. When availT is equal to TRUE and bCTUboudary is equal to TRUE, the down-sampled neighbouring top luma samples pTopDsY[x] with x=0 . . . nTbW−1 are specified as follows:

pTopDsY[x] with x=1 . . . nTbW−1 is derived as follows:

$$pTopDsY[x]=(pY[2*x-1][-1]+2*pY[2*x][-1]+pY [2*x+1][-1]+2)>>2$$

If availTL is equal to TRUE, pTopDsY[0] is derived as follows:

$$pTopDsY[0]=(pY[-1][-1]+2*pY[0][-1]+pY[1][-1]+2) >>2$$

Otherwise, pTopDsY[0] is derived as follows:

$$pTopDsY[0]=pY[0][-1]$$

7. The variables nS, xS, yS, k0, k1 are derived as follows:

$$nS=((availL \text{ \&\& } availT)?\text{Min}(nTbW,nTbH): (availL?nTbH:nTbW))$$

$$xS=1<<(((nTbW>nTbH) \text{ \&\& } availL \text{ \&\& } availT)? (\text{Log }2(nTbW)-\text{Log }2(nTbH)):0)$$

$$yS=1<<(((nTbH>nTbW) \text{ \&\& } availL \text{ \&\& } availT)? (\text{Log }2(nTbH)-\text{Log }2(nTbW)):0)$$

$$k1=((availL \text{ \&\& } availT)? \text{ Log }2(nS)+1:\text{Log }2(nS))$$

$$k0=\text{BitDepth}C+k1-15$$

S. Variables 1, c, ll, lc and k1 are derived as follows:

$$1=(availL?\Sigma_{y=0}^{nS-1}pLeftDsY[y*yS]: 0)+ (availT?\Sigma_{x=0}^{nS-1}pTopDsY[x*xS]: 0)$$

$$c=(availL?\Sigma_{y=0}^{nS-1}p[-1][y*yS]: 0)+(availT?\Sigma_{x=0}^{nS-1}p [x*xS][-1]: 0)$$

$$ll=(availL?\Sigma_{y=0}^{nS-1}(pLeftDsY[y*yS])^2: 0)+ (availT?\Sigma_{x=0}^{nS-1}(pTopDsY[x*xS])^2: 0)$$

$$lc=(availL?\Sigma_{y=0}^{nS-1}pLeftDsY[y*yS] * p[-1][y*yS]: 0)+(availT?\Sigma_{x=0}^{nS-1}pTopDsY[x*xS] * p[x*xS][- 1]: 0)$$

9. When k0 is greater than 0, the variable 1, c, ll, lc and k1 are modified as follows $$1=(1+(1<<(k0-1)))>>k0$$

$$c=(c+(c<<(k0-1)))>>k0$$

$$ll=(ll+(ll<<(k0-1)))>>k0$$

$$lc=(lc+(lc<<(k0-1)))>>k0$$

$$k1=k1-k0$$

10. The variables a, b, and k are derived as follows:
If k1 is equal to 0, the following applies:

$$k=0$$

$$a=0$$

$$b=1<<(\text{BitDepth}C-1)$$

Otherwise, the following applies:

$$avgY=1>>k1$$

$$errY=1\&((1<<k1)-1)$$

$$avgC=c>>k1$$

$$errC=c\&((1<<k1)-1$$

$$a1=lc-((avgY*avgC)<<k1+avgY*errC+avgC*errY)$$

$$a2=ll-((avgY2)<<k1+2*avgY*errY)$$

$k2=(a1==0)?0: \text{Max}(0,\text{Floor}(\text{Log 2}(\text{Abs}(a1)))-\text{BitDepth}C+2)$ $k3=(a2==0)?0: \text{Max}(0,\text{Floor}(\text{Log 2}(\text{Abs}(a2)))-5)$ $k4=k3-k2+\text{BitDepth}C-2$ $a1s=a1>>k2$ $a2s=a2>>k3$ $a2t=(a2s<32)?0:((1<<(\text{BitDepth}Y+4))+a2s/2)/a2s$ if($a2s<32$)

$a3=0$ else if($a2s>=32 \text{ \&\& } k4>=0$)

$a3=(a1s*a2t)>>k4$ else $a3=(a1s*a2t)<<(-k4)$ $a4=\text{Clip3}(-28,28-1,a3)$ $a5=a4<<7$ $k5=(a5==0)?0:\text{Floor}(\text{Log 2}(\text{Abs}(a5)+(\text{Sign2}(a5)-1)/2))-5$ $k=13-k5$ $a=a5>>k5$ $b=\text{avgC}-((a*\text{avg}Y)>>k)$ 11. The prediction samples predSamples[x][y] with x=0 . . . nTbW−1, y=0 . . . nTbH−1 are derived as follows:

predSamples[x][y]=Clip1C(((pDsY[x][y]*a)>>k)+b)

In the specification, it may be determined that in particular, Equations 12 to 14 are disclosed.

bCTUboundary=yCbC & ((1<<(Ctb Log 2SizeY−1)−1)==0  [Equation 12]

Concerning Equation 12, whether the top boundary of the luma block overlaps with the boundary of the CTU may be determined based on whether Equation 12 is TRUE or FALSE, and in Equation 12, yCbC may represent a y-axis direction position of an upper left sample of a current chroma block for an upper left sample of a current chroma picture, and Ctb Log 2SizeY may represent a log value of a luma CTB size.

Next, Equation 13 is as follows.

pTopDsY[x]=(pY[2*x−1][−1]+2*pY[2*x][−1]+pY[2*x+1][−1]+2)>>2  [Equation 13]

In Equation 13, pTopDsY[x] represents a sample value of a luma reference sample to which downsampling is applied and located at the upper side of the top boundary of the luma block, x represents an x-axis position of the luma reference sample to which the downsampling is applied, pY[2*x−1][−1], pY[2*x][−1], and pY[2*x+1][−1] represent sample values, respectively of the luma reference samples located at the upper side, and the y-axis position of the luma reference samples located at the upper side is −1.

In an embodiment, when a value of x is 0 and there is the sample value pY[−1][−1], Equation 13 may be represented with Equation 14.

pTopDsY[0]=(pY[−1][−1]+2*pY[0][−1]+pY[1][−1]+2)>>2  [Equation 14]

In Equation 14, pTopDsY[0] represents a sample value of a luma reference sample to which the downsampling is applied and located at the upper side of the top boundary when an x-axis position of the luma reference sample to which the downsampling is applied and located at the upper side of the top boundary is 0, and pY[−1][−1], pY[0][−1], and pY[1][−1] represent sample values of the luma reference samples, respectively, located at the upper side, and a y-axis position of the luma reference samples located at the upper side is −1.

In an embodiment, when a value of x is 0 and there is no sample value of pY[−1][−1], Equation 13 may be represented with Equation 15.

pTopDsY[0]=pY[0][−1]  [Equation 15]

In Equation 15, pTopDsY[0] represents a sample value of the luma reference sample to which the downsampling is applied and located at the upper side of the top boundary when an x-axis position of the luma reference sample to which the downsampling is applied and located at the upper side of the top boundary of the luma block is 0, and pY[0][−1] represents a sample value of the luma reference sample located at the upper side of the luma block.

According to a decoding apparatus and a method of operating the decoding apparatus of FIGS. 15 and 16, when an intra prediction mode of the chroma block is a cross-component linear model (CCLM) mode, the decoding apparatus derives neighboring chroma reference samples for the chroma block (S1600), derives neighboring luma reference samples of the luma block corresponding to the chroma block and luma samples in the luma block (S1610), down-sample the neighboring luma reference samples and the luma samples to derive the down-sampled neighboring luma reference samples and the down-sampled luma samples (S1620), derive a linear model parameter based on the down-sampled neighboring luma reference samples and the neighboring chroma reference samples (S1630), generate a prediction sample for the chroma block based on the linear model parameter and down-sampled luma samples of the luma block (S1640), reconstruct the chroma block based on the prediction samples for the chroma block (S1650), wherein the neighboring luma reference samples include top neighboring luma reference samples located at the upper side of a top boundary of the luma block and left neighboring luma reference samples located at the left side of the left boundary of the luma block, and when the top boundary of the luma block overlaps with a boundary of a coding tree unit (CTU), the number of the top neighboring luma reference samples used for deriving the down-sampled neighboring luma reference samples among the neighboring luma reference samples may be less than that of the left neighboring luma reference samples used for deriving the down-sampled neighboring luma reference samples. That is, when performing CCLM-based intra prediction, by downsampling neighboring luma reference samples of a 1-sample line, image coding efficiency can be improved, and when implementing CCLM-based intra prediction in hardware, pipeline delay can be improved.

The above-described method according to this document may be implemented in a software form, and the encoding apparatus and/or the decoding apparatus according to this document may be included in an apparatus that performs image processing of, for example, a TV, a computer, a smartphone, a set-top box, a display device, and the like.

The above-described each part, module, or unit may be a processor or a hardware part that executes successive procedures stored in a memory (or storage unit). Each step described in the foregoing embodiment may be performed by a processor or hardware parts. Each module/block/unit described in the foregoing embodiment may operate as hardware/processor. Further, methods suggested by this document may be executed as a code. The code may be written in a processor readable storage medium and may be thus read by a processor provided by an apparatus.

In the above-described embodiments, methods are described on the basis of a flowchart using a series of steps or blocks, but this document is not limited to the sequence of steps. Some steps may occur simultaneously or in a different sequence than the steps described above. Further, those skilled in the art will understand that the steps shown in the sequence diagram are not exclusive, that other steps may be included, or that one or more steps in the flowchart may be deleted without affecting the scope of this document.

When the embodiments of this document are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A decoding apparatus for an image decoding, the decoding apparatus comprising:
   a memory; and
   at least one processor connected to the memory, the at least one processor configured to:
      obtain image information including residual information from a bitstream;
      derive down-sampled neighboring luma samples based on neighboring luma samples of a luma block related to a chroma block;
      derive a linear model parameter based on the down-sampled neighboring luma samples and neighboring chroma samples of the chroma block;
      derive down-sampled luma samples based on luma samples in the luma block;
      derive prediction samples of the chroma block based on the linear model parameter and the down-sampled luma samples;
      derive residual samples of the chroma block based on the residual information; and
      generate reconstructed samples based on the prediction samples and the residual samples,
   wherein the neighboring luma samples includes top neighboring luma samples located above a top boundary of the luma block,
   wherein the down-sampled neighboring luma samples includes a down-sampled top neighboring luma sample,
   wherein based on a current coding tree unit (CTU) in which the luma block located being equal to a CTU in which the top neighboring luma samples are located, six top neighboring luma samples among the top neighboring luma samples of two sample row are used for deriving the down-sampled top neighboring luma sample, and
   wherein based on the current CTU in which the luma block located being different from the CTU in which the top neighboring luma samples are located, three top neighboring luma samples among the top neighboring luma samples of one sample row are used for deriving the down-sampled top neighboring luma sample.

2. An encoding apparatus for an image encoding, the encoding apparatus comprising:
   a memory; and
   at least one processor connected to the memory, the at least one processor configured to:
      derive down-sampled neighboring luma samples based on neighboring luma samples of a luma block related to a chroma block;
      derive a linear model parameter based on the down-sampled neighboring luma samples and neighboring chroma samples of the chroma block;
      derive down-sampled luma samples based on luma samples in the luma block;
      derive prediction samples of the chroma block based on the linear model parameter and the down-sampled luma samples;
      derive residual samples based on the prediction samples;
      generate residual information based on the residual samples; and
      encode image information including the residual information;
   wherein the neighboring luma samples includes top neighboring luma samples located above a top boundary of the luma block,
   wherein the down-sampled neighboring luma samples includes a down-sampled top neighboring luma sample, and
   wherein based on a current coding tree unit (CTU) in which the luma block located being equal to a CTU in which the top neighboring luma samples are located, six top neighboring luma samples among the top neighboring luma samples of two sample row are used for deriving the down-sampled top neighboring luma sample, and
   wherein based on the current CTU in which the luma block located being different from the CTU in which the top neighboring luma samples are located, three top neighboring luma samples among the top neighboring luma samples of one sample row are used for deriving the down-sampled top neighboring luma sample.

3. An apparatus for transmitting data for an image, the apparatus comprising:
   at least one processor configured to obtain a bitstream for the image, wherein the bitstream is generated based on deriving down-sampled neighboring luma samples based on neighboring luma samples of a luma block related to a chroma block, deriving a linear model parameter based on the down-sampled neighboring luma samples and neighboring chroma samples of the chroma block, deriving down-sampled luma samples based on luma samples in the luma block, deriving prediction samples of the chroma block based on the linear model parameter and the down-sampled luma samples, deriving residual samples based on the prediction samples, generating residual information based on the residual samples, and encoding image information to generate the bitstream, wherein the image information includes the residual information; and a transmitter configured to transmit the data comprising the bitstream, wherein the neighboring luma samples includes top neighboring luma samples located above a top boundary of the luma block, wherein the down-sampled neighboring luma samples includes a down-sampled top neighboring luma sample, and wherein based on a current coding tree unit (CTU) in which the luma block located being equal to a CTU in which the top neighboring luma samples are located, six top neighboring luma samples among the top neighboring luma samples of two sample row are used for deriving the down-sampled top neighboring luma sample, and wherein based on the current CTU in which the luma block located being different from the CTU in which the top neighboring luma samples are located, three top neighboring luma samples among the top neighboring luma samples of one sample row are used for deriving the down-sampled top neighboring luma sample.

* * * * *